US012462817B2

(12) United States Patent
Gao et al.

(10) Patent No.: US 12,462,817 B2
(45) Date of Patent: Nov. 4, 2025

(54) THREE-DIMENSIONAL AUDIO SIGNAL CODING METHOD AND APPARATUS, AND ENCODER

(71) Applicant: HUAWEI TECHNOLOGIES CO., LTD., Guangdong (CN)

(72) Inventors: Yuan Gao, Beijing (CN); Shuai Liu, Beijing (CN); Bin Wang, Shenzhen (CN); Zhe Wang, Beijing (CN); Tianshu Qu, Beijing (CN); Jiahao Xu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 188 days.

(21) Appl. No.: 18/511,025

(22) Filed: Nov. 16, 2023

(65) Prior Publication Data

US 2024/0087578 A1 Mar. 14, 2024

Related U.S. Application Data

(63) Continuation of application No. PCT/CN2022/091568, filed on May 7, 2022.

(30) Foreign Application Priority Data

May 17, 2021 (CN) ......................... 202110536623.0

(51) Int. Cl.
*G10L 19/008* (2013.01)
*G10L 19/16* (2013.01)
*H04S 7/00* (2006.01)

(52) U.S. Cl.
CPC .......... *G10L 19/008* (2013.01); *G10L 19/167* (2013.01); *H04S 7/00* (2013.01); *H04S 2420/11* (2013.01)

(58) Field of Classification Search
None
See application file for complete search history.

(56) References Cited

U.S. PATENT DOCUMENTS

2014/0307877 A1* 10/2014 Sumioka ................ H04S 7/304 381/17
2017/0105082 A1* 4/2017 Kim .......................... H04S 3/02

FOREIGN PATENT DOCUMENTS

CN 107147975 A 9/2017

* cited by examiner

*Primary Examiner* — Quynh H Nguyen
(74) *Attorney, Agent, or Firm* — WOMBLE BOND DICKINSON (US) LLP

(57) ABSTRACT

A three-dimensional audio signal coding method, apparatus, and encoder are described. The method includes, after obtaining a first correlation between a current frame of a three-dimensional audio signal and a representative virtual speaker set for a previous frame, the encoder determines whether the first correlation satisfies a reuse condition, where the first correlation is used to determine whether to reuse the representative virtual speaker set for the previous frame when the current frame is encoded. The method further encodes the current frame based on the representative virtual speaker set for the previous frame when the first correlation satisfies the reuse condition, to obtain a bitstream. A virtual speaker in the representative virtual speaker set for the previous frame is a virtual speaker used for encoding the previous frame of the three-dimensional audio signal.

18 Claims, 14 Drawing Sheets

THREE-DIMENSIONAL AUDIO SIGNAL CODING METHOD AND APPARATUS, AND ENCODER

CROSS-REFERENCE TO RELATED APPLICATIONS

This application is a continuation of International Application No. PCT/CN2022/091568, filed on May 7, 2022, which claims priority to Chinese Patent Application No. 202110536623.0, filed on May 17, 2021. The disclosures of the aforementioned applications are hereby incorporated by reference in their entireties.

TECHNICAL FIELD

This application relates to the multimedia field, and in particular, to a three-dimensional audio signal coding method and apparatus, and an encoder.

BACKGROUND

With rapid development of high-performance computers and signal processing technologies, listeners raise increasingly high requirements for voice and audio experience. Immersive audio can satisfy people's requirements for the voice and audio experience. For example, a three-dimensional audio technology is widely used in wireless communication (for example, 4G/5G) voice, virtual reality/augmented reality, media audio, and other aspects. Three-dimensional audio technology is an audio technology for obtaining, processing, transmitting, rendering, and reproducing sound and three-dimensional sound field information in a real world, to provide the sound with a strong impression of space, envelopment, and immersion. This provides the listeners with extraordinary immersive auditory experience.

Generally, an acquisition device (for example, a microphone) acquires a large amount of data to record three-dimensional sound field information, and transmits a three-dimensional audio signal to a playback device (for example, a speaker or an earphone), so that the playback device plays three-dimensional audio. Because an amount of data of the three-dimensional sound field information is large, a large amount of storage space is required to store the data, and a high bandwidth is required for transmitting the three-dimensional audio signal. To solve the foregoing problems, the three-dimensional audio signal may be compressed, and compressed data may be stored or transmitted. Currently, an encoder first traverses virtual speakers in a candidate virtual speaker set, and compresses a three-dimensional audio signal by using a selected virtual speaker. Therefore, calculation complexity of performing compression coding on the three-dimensional audio signal by the encoder is high. How to reduce the calculation complexity of performing compression coding on the three-dimensional audio signal is an urgent problem to be resolved.

SUMMARY

This application provides a three-dimensional audio signal coding method and apparatus, and an encoder, to reduce calculation complexity of performing compression coding on a three-dimensional audio signal.

According to a first aspect, this application provides a three-dimensional audio signal encoding method. The method may be executed by an encoder, and specifically includes the following operations: After obtaining a first correlation between a current frame of a three-dimensional audio signal and a representative virtual speaker set for a previous frame, the encoder determines whether the first correlation satisfies a reuse condition, and encodes the current frame based on the representative virtual speaker set for the previous frame if the first correlation satisfies the reuse condition, to obtain a bitstream. A virtual speaker in the representative virtual speaker set for the previous frame is a virtual speaker used for encoding the previous frame of the three-dimensional audio signal, and the first correlation is used to determine whether to reuse the representative virtual speaker set for the previous frame when the current frame is encoded.

In this way, the encoder may first determine whether the representative virtual speaker set for the previous frame can be reused to encode the current frame. If the encoder reuses the representative virtual speaker set for the previous frame to encode the current frame, a process in which the encoder searches for a virtual speaker again is avoided, to effectively reduce calculation complexity of searching for the virtual speaker by the encoder. This reduces calculation complexity of performing compression coding on the three-dimensional audio signal and calculation load of the encoder. In addition, frequent changes of virtual speakers in different frames can be reduced, orientation continuity between frames is enhanced, sound image stability of a reconstructed three-dimensional audio signal is improved, and sound quality of the reconstructed three-dimensional audio signal is ensured.

If the encoder cannot reuse the representative virtual speaker set for the previous frame to encode the current frame, the encoder selects a representative coefficient, uses the representative coefficient of the current frame to vote for each virtual speaker in a candidate virtual speaker set, and selects a representative virtual speaker for the current frame based on a vote value, to reduce the calculation complexity of performing compression coding on the three-dimensional audio signal and the calculation load of the encoder.

In a possible embodiment, after the obtaining a first correlation between a current frame of a three-dimensional audio signal and a representative virtual speaker for a previous frame, the method further includes: The encoder obtains a second correlation between the current frame and the candidate virtual speaker set. The second correlation is used to determine whether the candidate virtual speaker set is used when the current frame is encoded, and the representative virtual speaker set for the previous frame is a proper subset of the candidate virtual speaker set. The reuse condition includes: The first correlation is greater than the second correlation. It indicates that, relative to the candidate virtual speaker set, the encoder prefers to reuse the representative virtual speaker set for the previous frame to encode the current frame.

In some embodiments, the obtaining a first correlation between a current frame of a three-dimensional audio signal and a representative virtual speaker for a previous frame includes: The encoder obtains a correlation between the current frame and each representative virtual speaker for the previous frame in the representative virtual speaker set for the previous frame; and uses a largest correlation in the correlations between the current frame and the representative virtual speakers for the previous frame as the first correlation.

For example, the representative virtual speaker set for the previous frame includes a first virtual speaker, and the obtaining a first correlation between a current frame of a three-dimensional audio signal and a representative virtual speaker set for a previous frame includes: The encoder determines a correlation between the current frame and the first virtual speaker based on a coefficient of the current frame and a coefficient of the first virtual speaker.

In some embodiments, the obtaining a second correlation between the current frame and the candidate virtual speaker set includes: obtaining a correlation between the current frame and each candidate virtual speaker in the candidate virtual speaker set; and using a largest correlation in the correlations between the current frame and the candidate virtual speakers as the second correlation.

Therefore, the encoder selects a typical largest correlation from a plurality of correlations, and determines, by using the largest correlation, whether the representative virtual speaker set for the previous frame can be reused to encode the current frame. This reduces the calculation complexity of performing compression coding on the three-dimensional audio signal and the calculation load of the encoder while ensuring accuracy of the determining.

In another possible embodiment, after the obtaining a first correlation between a current frame of a three-dimensional audio signal and a representative virtual speaker for a previous frame, the method further includes: obtaining a third correlation between the current frame and a first subset of a candidate virtual speaker set. The third correlation is used to determine whether the first subset of the candidate virtual speaker set is used when the current frame is encoded, and the first subset is a proper subset of the candidate virtual speaker set. The reuse condition includes: The first correlation is greater than the third correlation. It indicates that, relative to the first subset of the candidate virtual speaker set, the encoder prefers to reuse the representative virtual speaker set for the previous frame to encode the current frame.

In another possible embodiment, after the obtaining a first correlation between a current frame of a three-dimensional audio signal and a representative virtual speaker for a previous frame, the method further includes: The encoder obtains a fourth correlation between the current frame and a second subset of a candidate virtual speaker set, where the fourth correlation is used to determine whether the second subset of the candidate virtual speaker set is used when the current frame is encoded, and the second subset is a proper subset of the candidate virtual speaker set; and obtains a fifth correlation between the current frame and a third subset of the candidate virtual speaker set if the first correlation is less than or equal to the fourth correlation. The fifth correlation is used to determine whether the third subset of the candidate virtual speaker set is used when the current frame is encoded, the third subset is a proper subset of the candidate virtual speaker set, and a virtual speaker included in the second subset and a virtual speaker included in the third subset are all or partially different. The reuse condition includes: The first correlation is greater than the fifth correlation. It indicates that, relative to the third subset of the candidate virtual speaker set, the encoder prefers to reuse the representative virtual speaker set for the previous frame to encode the current frame. In this way, the encoder performs a more adequate multi-level determination on different subsets in the candidate virtual speaker set, to ensure accuracy of reusing the representative virtual speaker set for the previous frame when the current frame is encoded.

In another possible embodiment, if the first correlation does not satisfy the reuse condition, the method further includes: The encoder obtains a fourth quantity of coefficients of the current frame of the three-dimensional audio signal and frequency domain feature values of the fourth quantity of coefficients; selects a third quantity of representative coefficients from the fourth quantity of coefficients based on the frequency domain feature values of the fourth quantity of coefficients; then selects a second quantity of representative virtual speakers for the current frame from the candidate virtual speaker set based on the third quantity of representative coefficients; and encodes the current frame based on the second quantity of the representative virtual speakers for the current frame, to obtain the bitstream. The fourth quantity of coefficients includes the third quantity of representative coefficients, and the third quantity is less than the fourth quantity. It indicates that the third quantity of representative coefficients are a part of the fourth quantity of coefficients. The current frame of the three-dimensional audio signal is a higher order ambisonics (HOA) signal, and a frequency domain feature value of a coefficient is determined based on a coefficient of the HOA signal.

In this way, the encoder selects a part of coefficients from all coefficients of the current frame as representative coefficients, and selects a representative virtual speaker from the candidate virtual speaker set by using a small quantity of representative coefficients instead of all the coefficients of the current frame, to effectively reduce the calculation complexity of searching for the virtual speaker by the encoder. This reduces the calculation complexity of performing compression coding on the three-dimensional audio signal and the calculation load of the encoder.

In addition, that the encoder encodes the current frame based on the second quantity of the representative virtual speakers for the current frame, to obtain the bitstream includes: The encoder generates a virtual speaker signal based on the second quantity of representative virtual speakers for the current frame and the current frame; and encodes the virtual speaker signal, to obtain the bitstream.

Because the frequency domain feature value of the coefficient of the current frame represents a sound field characteristic of the three-dimensional audio signal, the encoder selects, based on the frequency domain feature value of the coefficient of the current frame, a representative coefficient that is of the current frame and that has a representative sound field component, and the representative virtual speaker for the current frame selected from the candidate virtual speaker set by using the representative coefficient can fully represent the sound field characteristic of the three-dimensional audio signal. Therefore, accuracy of generating the virtual speaker signal when the encoder performs compression coding on a to-be-encoded three-dimensional audio signal by using the representative virtual speaker for the current frame is further improved. This helps improve a compression ratio of performing compression coding on the three-dimensional audio signal, and reduce a bandwidth occupied by the encoder to transmit the bitstream.

In another possible embodiment, the selecting a second quantity of representative virtual speakers for the current frame from the candidate virtual speaker set based on the third quantity of representative coefficients includes: The encoder determines a first quantity of virtual speakers and a first quantity of vote values based on the third quantity of representative coefficients of the current frame, the candidate virtual speaker set, and a quantity of vote rounds, and selects the second quantity of representative virtual speakers for the current frame from the first quantity of virtual speakers based on the first quantity of vote values. The second quantity is less than the first quantity. It indicates that the second quantity of representative virtual speakers for the current frame are a part of virtual speakers in the candidate virtual speaker set. It may be understood that the virtual speakers are in a one-to-one correspondence with the vote values. For example, the first quantity of virtual speakers include a first virtual speaker, the first quantity of vote values include a vote value of the first virtual speaker, and the first virtual speaker corresponds to the vote value of the first virtual speaker. The vote value of the first virtual speaker represents a priority of using the first virtual speaker when the current frame is encoded. The candidate virtual speaker set includes a fifth quantity of virtual speakers, the fifth quantity of virtual speakers include the first quantity of virtual speakers, the first quantity is less than or equal to the fifth quantity, the quantity of vote rounds is an integer greater than or equal to 1, and the quantity of vote rounds is less than or equal to the fifth quantity.

Currently, in a process of searching for a virtual speaker, the encoder uses a result of correlation calculation between a to-be-encoded three-dimensional audio signal and the virtual speaker as a selection measurement indicator of the virtual speaker. In addition, if the encoder transmits one virtual speaker for each coefficient, data cannot be compressed efficiently, resulting in heavy calculation load on the encoder. According to the virtual speaker selection method provided in this embodiment of this application, the encoder votes for each virtual speaker in the candidate virtual speaker set by using a small quantity of representative coefficients instead of all coefficients of the current frame, and selects the representative virtual speaker for the current frame based on vote values. Further, the encoder performs compression coding on the to-be-encoded three-dimensional audio signal by using the representative virtual speaker for the current frame. This effectively improves a compression rate of performing compression coding on the three-dimensional audio signal, and also reduces the calculation complexity of searching for the virtual speaker by the encoder. This reduces the calculation complexity of performing compression coding on the three-dimensional audio signal and the calculation load of the encoder.

The second quantity represents a quantity of representative virtual speakers for the current frame selected by the encoder. A larger second quantity indicates a larger quantity of representative virtual speakers for the current frame and more sound field information of the three-dimensional audio signal; and a smaller second quantity indicates a smaller quantity of representative virtual speakers for the current frame and less sound field information of the three-dimensional audio signal. Therefore, the quantity of representative virtual speakers for the current frame selected by the encoder may be controlled by setting the second quantity. For example, the second quantity may be preset. For another example, the second quantity may be determined based on the current frame. For example, a value of the second quantity may be 1, 2, 4, or 8.

In another possible embodiment, the selecting the second quantity of representative virtual speakers for the current frame from the first quantity of virtual speakers based on the first quantity of vote values includes: The encoder obtains, based on the first quantity of vote values and a sixth quantity of final vote values of the previous frame, a seventh quantity of final vote values of the current frame that correspond to a seventh quantity of virtual speakers and the current frame, and selects the second quantity of representative virtual speakers for the current frame from the seventh quantity of virtual speakers based on the seventh quantity of final vote values of the current frame. The second quantity is less than the seventh quantity. It indicates that the second quantity of representative virtual speakers for the current frame are a part of the seventh quantity of the virtual speakers. The seventh quantity of virtual speakers include the first quantity of virtual speakers, the seventh quantity of virtual speakers include a sixth quantity of virtual speakers, and virtual speakers included in the sixth quantity of virtual speakers are representative virtual speakers for the previous frame used for encoding the previous frame of the three-dimensional audio signal. The sixth quantity of virtual speakers included in the representative virtual speaker set for the previous frame are in a one-to-one correspondence with the sixth quantity of final vote values of the previous frame.

Because a location of a real sound source does not necessarily overlap a location of a virtual speaker in a process of searching for the virtual speaker, the virtual speaker may not necessarily form a one-to-one correspondence with the real sound source. In addition, in an actual complex scenario, a limited quantity of virtual speaker sets may not represent all sound sources in a sound field. In this case, virtual speakers found in different frames may frequently change, and this change significantly affects auditory experience of a listener. As a result, obvious discontinuity and noise appear in a decoded and reconstructed three-dimensional audio signal. According to the virtual speaker selection method provided in this embodiment of this application, the representative virtual speaker for the previous frame is inherited. That is, for virtual speakers with a same number, an initial vote value of the current frame is adjusted by using a final vote value of the previous frame, so that the encoder more tends to select the representative virtual speaker for the previous frame. This alleviates frequent changes of virtual speakers in different frames, enhances continuity of signal orientations between frames, improves sound image stability of the reconstructed three-dimensional audio signal, and ensures sound quality of the reconstructed three-dimensional audio signal.

In some embodiments, the method further includes: The encoder may further acquire the current frame of the three-dimensional audio signal, to perform compression encoding on the current frame of the three-dimensional audio signal to obtain a bitstream, and transmit the bitstream to the decoder side.

According to a second aspect, this application provides a three-dimensional audio signal encoding apparatus. The apparatus includes modules configured to perform the three-dimensional audio signal encoding method according to any one of the first aspect or the possible designs of the first aspect. For example, the three-dimensional audio signal encoding apparatus includes a virtual speaker selection module and an encoding module. The virtual speaker selection module is configured to obtain a first correlation between a current frame of a three-dimensional audio signal and a representative virtual speaker set for a previous frame, where a virtual speaker in the representative virtual speaker set for the previous frame is a virtual speaker used for encoding the previous frame of the three-dimensional audio signal, and the first correlation is used to determine whether to reuse the representative virtual speaker set for the previous frame when the current frame is encoded; and the encoding module is configured to encode the current frame based on the representative virtual speaker set for the previous frame if the first correlation satisfies a reuse condition, to obtain a bitstream.

According to a third aspect, this application provides an encoder. The encoder includes at least one processor and a memory, and the memory is configured to store a group of computer instructions. When the processor executes the group of computer instructions, operation operations of the three-dimensional audio signal encoding method according to any one of the first aspect or the possible embodiments of the first aspect are performed.

According to a fourth aspect, this application provides a system. The system includes the encoder according to the third aspect and a decoder, the encoder is configured to perform operation operations of the three-dimensional audio signal encoding method according to any one of the first aspect or the possible embodiments of the first aspect, and the decoder is configured to decode a bitstream generated by the encoder.

According to a fifth aspect, this application provides a computer-readable storage medium, including computer software instructions. When the computer software instructions are run on an encoder, the encoder is enabled to perform operation operations of the method according to any one of the first aspect or the possible embodiments of the first aspect.

According to a sixth aspect, this application provides a computer program product. When the computer program product runs on an encoder, the encoder is enabled to perform operation operations of the method according to any one of the first aspect or the possible embodiments of the first aspect.

In this application, based on the embodiments according to the foregoing aspects, the embodiments may be combined to provide more embodiments.

DESCRIPTION OF EMBODIMENTS

Figure 1:
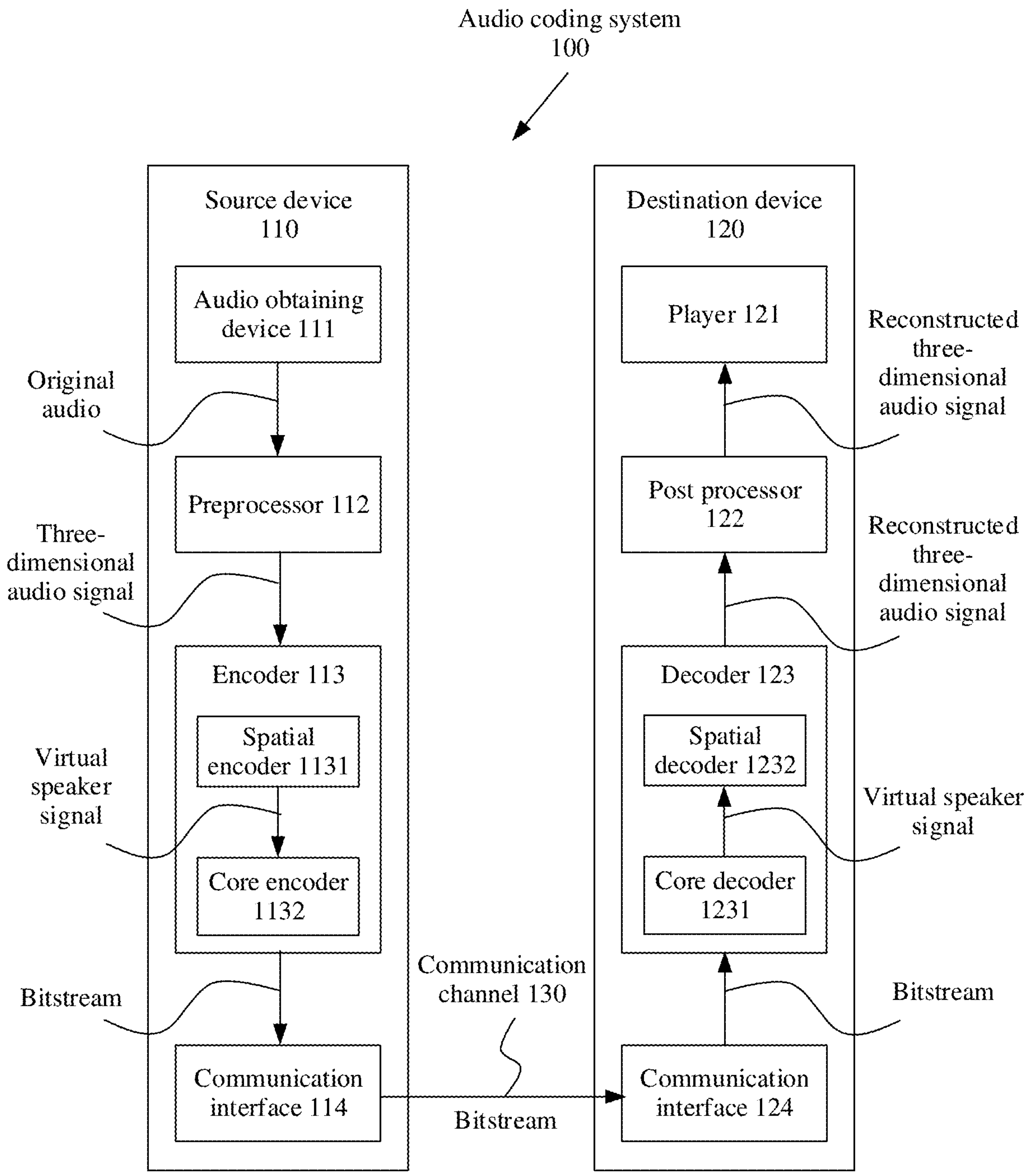
FIG. 1 is a schematic diagram of a structure of an audio coding system according to an embodiment of this application.

For clear and brief description of the following embodiments, a related technology is briefly described first.

Sound is a continuous wave produced by vibration of an object. An object that produces vibration and emits sound waves is referred to as a sound source. When a sound wave is propagated through a medium (such as air, solid, or liquid), sound can be perceived by human or animal auditory organs.

Characteristics of the sound wave include pitch, sound intensity, and timbre. The pitch indicates highness/lowness of the sound. The sound intensity indicates loudness/quietness of the sound. The sound intensity may also be referred to as loudness or volume. The unit of the sound intensity is decibel (dB). The timbre is also referred to as vocal quality.

Frequency of the sound wave determines a value of the pitch. Higher frequency indicates higher pitch. A quantity of times that an object vibrates within one second is referred to as frequency. The unit of the frequency is hertz (Hz). The frequency of sound that can be recognized by human ears ranges from 20 Hz to 20000 Hz.

Amplitude of the sound wave determines strength/weakness of the sound intensity. Greater amplitude indicates greater sound intensity. Closer to a sound source indicates greater sound intensity.

A waveform of the sound wave determines the timbre. The waveform of the sound wave includes a square wave, a sawtooth wave, a sine wave, a pulse wave, and the like.

According to the characteristics of the sound wave, the sound can be classified into regular sound and irregular sound. The irregular sound indicates sound produced by a sound source that vibrates irregularly. The irregular sound is, for example, noise that affects people's work, study, and the like. The regular sound indicates sound produced by a sound source that vibrates regularly. The regular sound includes voice and music. When the sound is represented by electricity, the regular sound is an analog signal that changes continuously in time-frequency domain. The analog signal may be referred to as an audio signal. The audio signal is an information carrier that carries voice, music, and sound effect.

Auditory sensation of human has a capability of distinguishing location distribution of a sound source in space. Therefore, when hearing sound in space, a listener can sense orientation of the sound in addition to pitch, sound intensity, and timbre of the sound.

With people's increasing attention and quality requirements on auditory system experience, a three-dimensional audio technology emerges to enhance a sense of depth, a sense of presence, and a sense of space of the sound. In this way, the listener senses sound produced by the front, back, left, and right sound sources, and also senses a feeling that space in which the listener is located is surrounded by a spatial sound field (sound field for short) produced by these sound sources, and a feeling that the sound spreads around. This creates immersive sound effect in which the listener feels like being in a cinema, a concert hall, or the like.

The three-dimensional audio technology indicates that space outside a human ear is assumed as a system, and a signal received at an eardrum is an output three-dimensional audio signal that is output by the system outside the ear by filtering sound produced by a sound source. For example, a system outside the human ear may be defined as a system impulse response $h(n)$, any sound source may be defined as $x(n)$, and a signal received at the eardrum is a convolution result of $x(n)$ and $h(n)$. The three-dimensional audio signal in this embodiment of this application may indicate a higher order ambisonics (HOA) signal. Three-dimensional audio may also be referred to as three-dimensional sound effect, spatial audio, three-dimensional sound field reconstruction, virtual 3D audio, binaural audio, or the like.

It is well known that a sound wave is propagated in an ideal medium, a quantity of waves is $k=w/c$, and an angular frequency is w=2πf. f is frequency of the sound wave, and c is speed of sound. Pressure p of the sound satisfies formula (1), and $\nabla^2$ is a Laplace operator.

$$\nabla^2 p + k^2 p = 0 \qquad \text{Formula (1)}$$

It is assumed that the space system outside the human ear is a sphere, the listener is in the center of the sphere, and sound from outside of the sphere has a projection on the sphere to filter out the sound outside the sphere. It is assumed that sound sources are distributed on the sphere, and a sound field produced by the sound source on the sphere is used to fit a sound field produced by original sound sources. That is, the three-dimensional audio technology is a method for fitting the sound field. Specifically, an equation in formula (1) is solved in a spherical coordinate system. In a passive spherical region, solution of the equation in formula (1) is the following formula (2):

$$p(r,\theta,\varphi,k)=s\Sigma_{m=0}^{\infty}(2m+1)j^{m}j_{m}^{kr}(kr)\Sigma_{0\leq n\leq m,\sigma=\pm 1}Y_{m,n}^{\sigma}(\theta_s,\varphi_s)Y_{m,n}^{\sigma}(\theta,\varphi) \qquad \text{Formula (2)}$$

r represents a sphere radius, θ represents a horizontal angle, φ represents a pitch angle, k represents a quantity of waves, s represents amplitude of an ideal plane wave, and m represents an order sequence number of the three-dimensional audio signal (or referred to as an order sequence number of the HOA signal). $j^{m}j_{m}^{kr}(kr)$ represents a spherical Bessel function, and the spherical Bessel function is also referred to as a radial basis function. The first j represents an imaginary unit, and $(2m+1)j^{m}j_{m}^{kr}(kr)$ does not change with an angle. $Y_{m,n}^{\sigma}(\theta,\varphi)$ represents a spherical harmonic function in a direction θ, φ, and $Y_{m,n}^{\sigma}(\theta_s,\varphi_s)$ represents a spherical harmonic function in a direction of the sound source. A coefficient of the three-dimensional audio signal satisfies formula (3).

$$B_{m,n}^{\sigma}=s\cdot Y_{m,n}^{\sigma}(\theta_s,\varphi_s) \qquad \text{Formula (3)}$$

Formula (3) is substituted into formula (2), and formula (2) may be transformed into formula (4).

$$p(r,\theta,\varphi,k)=\Sigma_{m=0}^{\infty}j^{m}j_{m}^{kr}(kr)\Theta_{0\leq n\leq m,\sigma=\pm 1}B_{m,n}^{\sigma}Y_{m,n}^{\sigma}(\theta,\varphi) \qquad \text{Formula (4)}$$

$B_{m,n}^{\sigma}$ represents an N-order coefficient of the three-dimensional audio signal, and is used to approximately describe the sound field. The sound field indicates a region in which a sound wave exists in a medium. N is an integer greater than or equal to 1. For example, a value of N is an integer ranging from 2 to 6. The coefficient of the three-dimensional audio signal in the embodiment of this application may indicate a HOA coefficient or an ambisonic coefficient.

The three-dimensional audio signal is an information carrier that carries spatial location information of a sound source in the sound field, and describes the sound field of a listener in space. Formula (4) shows that the sound field may be expanded on the sphere according to a spherical harmonic function, that is, the sound field may be decomposed into superposition of a plurality of plane waves. Therefore, the sound field described by the three-dimensional audio signal may be expressed by superposition of the plurality of plane waves, and the sound field is reconstructed by using coefficients of the three-dimensional audio signal.

Compared with the 5.1-channel audio signal or the 7.1-channel audio signal, the N-order HOA signal has $(N+1)^2$ channels. Therefore, the HOA signal includes a larger amount of data used to describe spatial information of the sound field. If an acquisition device (for example, a microphone) transmits the three-dimensional audio signal to a playback device (for example, a speaker), a high bandwidth needs to be consumed. Currently, an encoder may perform compression encoding on a three-dimensional audio signal by using spatial squeezed surround audio coding (S3AC) or directional audio coding (DirAC) to obtain a bitstream, and transmit the bitstream to the playback device. The playback device decodes the bitstream, reconstructs the three-dimensional audio signal, and plays a reconstructed three-dimensional audio signal. In this way, an amount of data for transmitting the three-dimensional audio signal to the playback device and bandwidth occupation are reduced. However, calculation complexity of performing compression coding on the three-dimensional audio signal by the encoder is high, and excessive computing resources of the encoder are occupied. Therefore, how to reduce the calculation complexity of performing compression coding on the three-dimensional audio signal is an urgent problem to be resolved.

Embodiments of this application provide an audio coding technology, and in particular, provide a three-dimensional audio coding technology oriented to the three-dimensional audio signal. Specifically, a coding technology in which fewer channels represent the three-dimensional audio signal is provided, to improve a conventional audio coding system. Audio encoding (or generally referred to as encoding) includes two parts: audio encoding and audio decoding. Audio encoding is performed at a source side and usually includes processing (for example, compressing) original audio to reduce an amount of data required to represent the original audio. In this way, more efficiently storing and/or transmitting are/is implemented. Audio decoding is performed at a destination side and usually includes inverse processing relative to the encoder to reconstruct the original audio. The encoding part and the decoding part are also collectively referred to as a codec. The following describes embodiments of this application in detail with reference to accompanying drawings.

FIG. 1 is a schematic diagram of a structure of an audio coding system according to an embodiment of this application. The audio coding system 100 includes a source device 110 and a destination device 120. The source device 110 is configured to perform compression encoding on a three-dimensional audio signal to obtain a bitstream, and transmit the bitstream to the destination device 120. The destination device 120 decodes the bitstream, reconstructs the three-dimensional audio signal, and plays a reconstructed three-dimensional audio signal.

Specifically, the source device 110 includes an audio obtaining device 111, a preprocessor 112, an encoder 113, and a communication interface 114.

The audio obtaining device 111 is configured to obtain original audio. The audio obtaining device 111 may be any type of audio acquisition device configured to capture sound in the real world, and/or any type of audio generating device. The audio obtaining device 111 is, for example, a computer audio processor configured to generate computer audio. The audio obtaining device 111 may alternatively be any type of memory or storage storing audio. The audio includes sound in the real world, sound in a virtual scene (such as virtual reality (VR) or augmented reality (AR)), and/or any combination thereof.

The preprocessor 112 is configured to receive the original audio acquired by the audio obtaining device 111, and preprocess the original audio to obtain the three-dimensional audio signal. For example, preprocessing performed by the preprocessor 112 includes channel conversion, audio format conversion, noise reduction, or the like.

The encoder 113 is configured to receive the three-dimensional audio signal generated by the preprocessor 112, and perform compression encoding on the three-dimensional audio signal to obtain the bitstream. For example, the encoder 113 may include a spatial encoder 1131 and a core encoder 1132. The spatial encoder 1131 is configured to select (or referred to as search for) a virtual speaker from a candidate virtual speaker set based on the three-dimensional audio signal, and generate a virtual speaker signal based on the three-dimensional audio signal and the virtual speaker. The virtual speaker signal may also be referred to as a playback signal. The core encoder 1132 is configured to encode the virtual speaker signal to obtain the bitstream.

The communication interface 114 is configured to receive the bitstream generated by the encoder 113, and send the bitstream to the destination device 120 through a communication channel 130. In this way, the destination device 120 can reconstruct the three-dimensional audio signal based on the bitstream.

The destination device 120 includes a player 121, a post processor 122, a decoder 123, and a communication interface 124.

The communication interface 124 is configured to receive the bitstream sent by the communication interface 114, and transmit the bitstream to the decoder 123. In this way, the decoder 123 can reconstruct the three-dimensional audio signal based on the bitstream.

The communication interface 114 and the communication interface 124 may be configured to send or receive related data of the original audio by using a direct communication link between the source device 110 and the destination device 120, for example, a direct wired or wireless connection, or by using any type of network, for example, a wired network, a wireless network, or any combination thereof, or any type of private network and public network, or any combination thereof.

Both the communication interface 114 and the communication interface 124 may be configured as a unidirectional communication interface, or a bidirectional communication interface, as indicated by an arrow that is from the source device 110 to the destination device 120 and that corresponds to the communication channel 130 in FIG. 1, and may be configured to send and receive messages, and the like, to establish a connection, confirm and exchange any other information related to data transmission, such as a communication link and/or encoded bitstream transmission, and/or the like.

The decoder 123 is configured to decode the bitstream, and reconstruct the three-dimensional audio signal. For example, the decoder 123 includes a core decoder 1231 and a spatial decoder 1232. The core decoder 1231 is configured to decode the bitstream to obtain a virtual speaker signal. The spatial decoder 1232 is configured to reconstruct the three-dimensional audio signal based on the candidate virtual speaker set and the virtual speaker signal to obtain a reconstructed three-dimensional audio signal.

The post processor 122 is configured to receive the reconstructed three-dimensional audio signal generated by the decoder 123, and perform post-processing on the reconstructed three-dimensional audio signal. For example, post-processing performed by the post processor 122 includes audio rendering, loudness normalization, user interaction, audio format conversion, noise reduction, or the like.

The player 121 is configured to play reconstructed sound based on the reconstructed three-dimensional audio signal.

It should be noted that the audio obtaining device 111 and the encoder 113 may be integrated into one physical device, or may be disposed on different physical devices. This is not limited. For example, the source device 110 shown in FIG. 1 includes an audio obtaining device 111 and an encoder 113, indicating that the audio obtaining device 111 and the encoder 113 are integrated into one physical device. In this case, the source device 110 may also be referred to as an acquisition device. The source device 110 is, for example, a media gateway of a radio access network, a media gateway of a core network, a transcoding device, a media resource server, an AR device, a VR device, a microphone, or another audio acquisition device. If the source device 110 does not include the audio obtaining device 111, it indicates that the audio obtaining device 111 and the encoder 113 are two different physical devices, and the source device 110 may acquire original audio from another device (for example, an audio acquisition device or an audio storage device).

In addition, the player 121 and the decoder 123 may be integrated into one physical device, or may be disposed on different physical devices. This is not limited. For example, the destination device 120 shown in FIG. 1 includes a player 121 and a decoder 123, indicating that the player 121 and the decoder 123 are integrated on one physical device. In this case, the destination device 120 may also be referred to as a playback device, and the destination device 120 has functions of decoding and playing reconstructed audio. The destination device 120 is, for example, a speaker, an earphone, or another audio playback device. If the destination device 120 does not include the player 121, it indicates that the player 121 and the decoder 123 are two different physical devices. After decoding the bitstream to reconstruct the three-dimensional audio signal, the destination device 120 transmits the reconstructed three-dimensional audio signal to another playing device (for example, a speaker or an earphone), and the another playing device plays back the reconstructed three-dimensional audio signal.

In addition, FIG. 1 shows that the source device 110 and the destination device 120 may be integrated into one physical device, or may be disposed on different physical devices. This is not limited.

Figure 2:
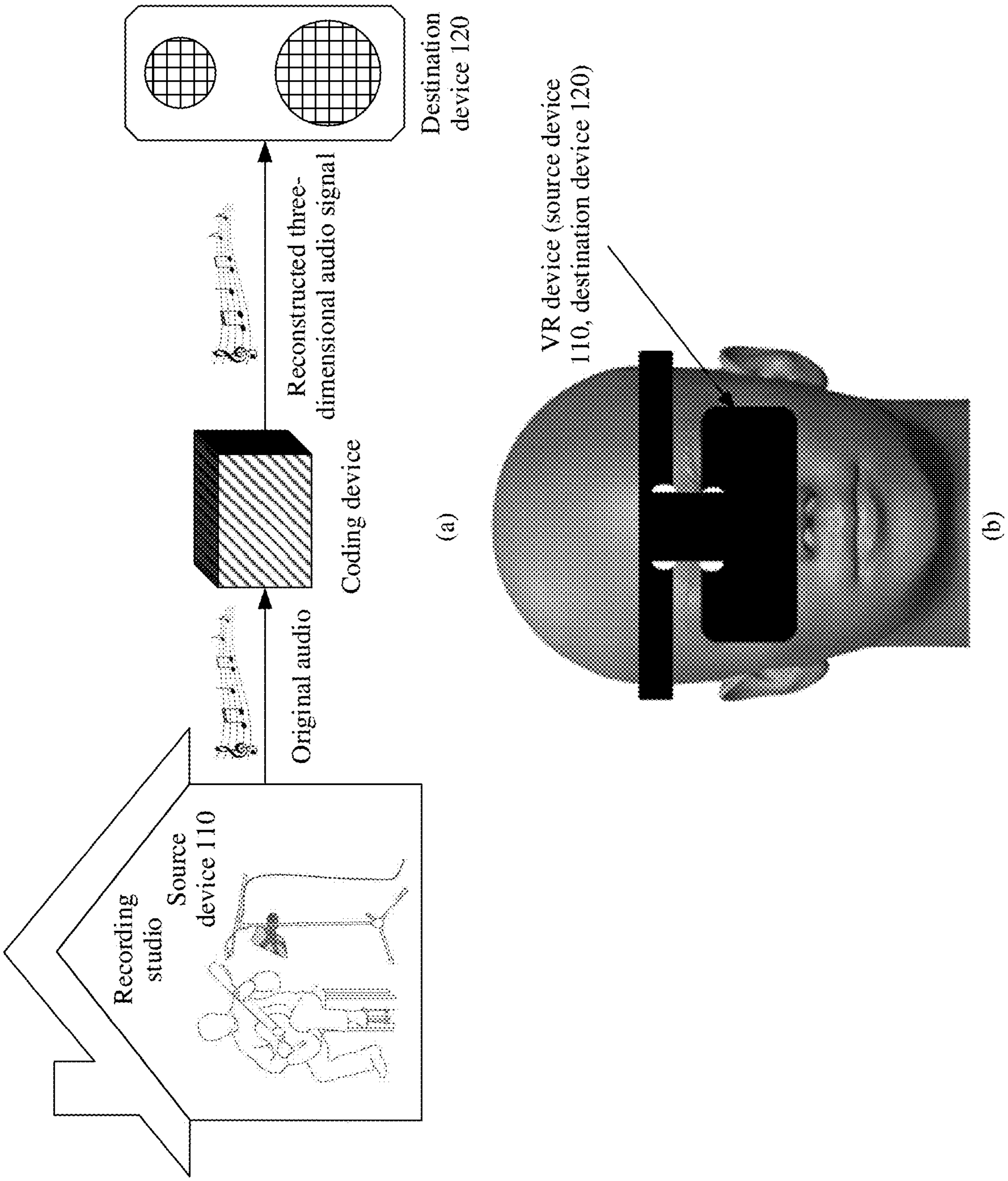
FIG. 2 is a schematic diagram of a scenario of an audio coding system according to an embodiment of this application.

For example, as shown in (a) in FIG. 2, the source device 110 may be a microphone in a recording studio, and the destination device 120 may be a speaker. The source device 110 may acquire original audio of various musical instruments, and transmit the original audio to a coding device. The coding device performs coding processing on the original audio to obtain a reconstructed three-dimensional audio signal, and the destination device 120 plays back the reconstructed three-dimensional audio signal. For another example, the source device 110 may be a microphone in a terminal device, and the destination device 120 may be an earphone. The source device 110 may acquire external sound or audio synthesized by the terminal device.

For another example, as shown in (b) in FIG. 2, the source device 110 and the destination device 120 are integrated into a virtual reality (VR) device, an augmented reality (AR) device, a mixed reality (MR) device, or an extended reality (XR) device. In this case, the VR/AR/MR/XR device has functions of acquiring original audio, playing back audio, and coding. The source device 110 may acquire sound produced by a user and sound produced by a virtual object in a virtual environment in which the user is located.

In these embodiments, the source device 110 or corresponding functions of the source device 110 and the destination device 120 or corresponding functions of the destination device 120 may be implemented by using the same hardware and/or software, or by using separate hardware and/or software, or any combination thereof. According to the description, existence and division of different units or functions in the source device 110 and/or the destination device 120 shown in FIG. 1 may vary depending on actual devices and applications. This is obvious to a skilled person.

A structure of the audio coding system is merely an example for description. In some possible embodiments, the audio coding system may further include another device. For example, the audio coding system may further include a terminal-side device or a cloud-side device. After acquiring the original audio, the source device 110 preprocesses the original audio to obtain a three-dimensional audio signal; and transmits the three-dimensional audio to the terminal-side device or the cloud-side device, so that the terminal-side device or the cloud-side device implements a function of coding the three-dimensional audio signal.

Figure 3:
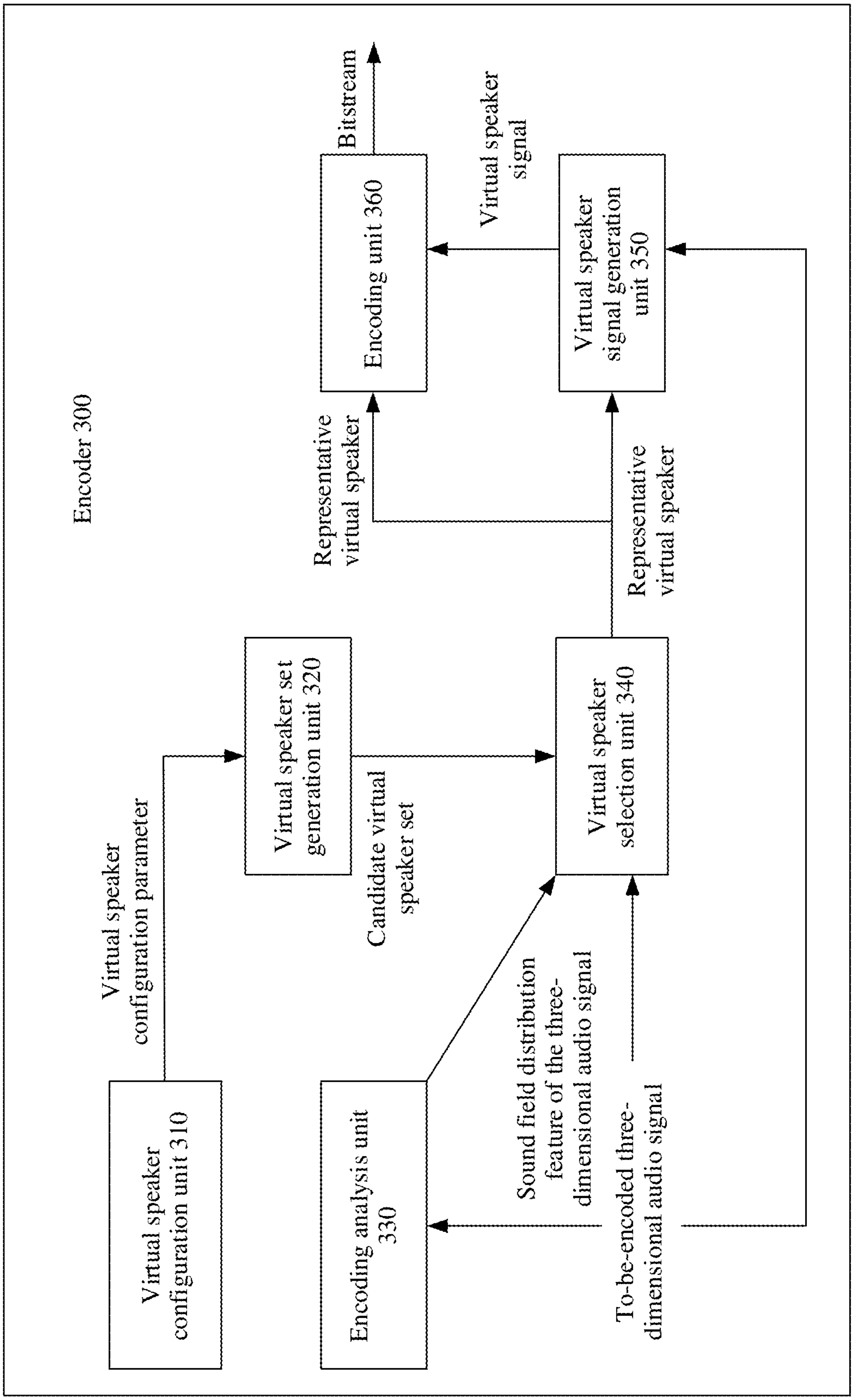
FIG. 3 is a schematic diagram of a structure of an encoder according to an embodiment of this application.

The audio signal coding method provided in embodiments of this application is mainly applied to an encoder side. A structure of the encoder is described in detail with reference to FIG. 3. As shown in FIG. 3, the encoder 300 includes a virtual speaker configuration unit 310, a virtual speaker set generation unit 320, an encoding analysis unit 330, a virtual speaker selection unit 340, a virtual speaker signal generation unit 350, and an encoding unit 360.

The virtual speaker configuration unit 310 is configured to generate a virtual speaker configuration parameter based on encoder configuration information, to obtain a plurality of virtual speakers. The encoder configuration information includes but is not limited to: an order (or usually referred to as an HOA order) of a three-dimensional audio signal, an encoding bit rate, user-defined information, and the like. The virtual speaker configuration parameter includes but is not limited to: a quantity of virtual speakers, an order of the virtual speaker, and location coordinates of the virtual speaker. The quantity of virtual speakers is, for example, 2048, 1669, 1343, 1024, 530, 512, 256, 128, or 64. The order of the virtual speaker may be any one of 2 to 6. The location coordinates of the virtual speaker include a horizontal angle and a pitch angle.

The virtual speaker configuration parameter output by the virtual speaker configuration unit 310 is used as an input of the virtual speaker set generation unit 320.

The virtual speaker set generation unit 320 is configured to generate a candidate virtual speaker set based on the virtual speaker configuration parameter, where the candidate virtual speaker set includes a plurality of virtual speakers. Specifically, the virtual speaker set generation unit 320 determines, based on the quantity of virtual speakers, the plurality of virtual speakers included in the candidate virtual speaker set, and determines a coefficient of the virtual speaker based on the location information (for example, coordinates) of the virtual speaker and the order of the virtual speaker. For example, a method for determining coordinates of the virtual speaker includes but is not limited to: generating a plurality of virtual speakers according to an equidistant rule, or generating a plurality of nonuniformly distributed virtual speakers according to an auditory perception principle; and then generating coordinates of the virtual speakers based on a quantity of virtual speakers.

The coefficient of the virtual speaker may also be generated according to the foregoing three-dimensional audio signal generation principle. $\theta_s$ and $\varphi_s$ in formula (3) are separately set to location coordinates of the virtual speaker, and $B_{m,n}^{\sigma}$ represents a coefficient of the N-order virtual speaker. The coefficient of the virtual speaker may also be referred to as an ambisonics coefficient.

The encoding analysis unit 330 is configured to perform encoding analysis on the three-dimensional audio signal, for example, analyze a sound field distribution feature of the three-dimensional audio signal, that is, features such as a quantity of sound sources of the three-dimensional audio signal, directivity of the sound source, and dispersion of the sound source.

Coefficients of the plurality of virtual speakers included in the candidate virtual speaker set output by the virtual speaker set generation unit 320 are used as inputs to the virtual speaker selection unit 340.

The sound field distribution feature of the three-dimensional audio signal output by the encoding analysis unit 330 is used as an input of the virtual speaker selection unit 340.

The virtual speaker selection unit 340 is configured to determine, based on the to-be-encoded three-dimensional audio signal, the sound field distribution feature of the three-dimensional audio signal, and the coefficients of the plurality of virtual speakers, a representative virtual speaker that matches the three-dimensional audio signal.

The encoder 300 in this embodiment of this application may not include the encoding analysis unit 330, that is, the encoder 300 may not analyze an input signal, and the virtual speaker selection unit 340 determines the representative virtual speaker by using a default configuration. This is not limited. For example, the virtual speaker selection unit 340 determines the representative virtual speaker matching the three-dimensional audio signal only based on the three-dimensional audio signal and the coefficients of the plurality of virtual speakers.

The encoder 300 may use a three-dimensional audio signal obtained from an acquisition device or a three-dimensional audio signal synthesized by using an artificial audio object as an input of the encoder 300. In addition, the three-dimensional audio signal input by the encoder 300 may be a time-domain three-dimensional audio signal or a frequency-domain three-dimensional audio signal. This is not limited.

Location information of the representative virtual speaker and a coefficient of the representative virtual speaker output by the virtual speaker selection unit 340 are used as inputs of the virtual speaker signal generation unit 350 and the encoding unit 360.

The virtual speaker signal generation unit 350 is configured to generate a virtual speaker signal based on the three-dimensional audio signal and attribute information of the representative virtual speaker. The attribute information of the representative virtual speaker includes at least one of the location information of the representative virtual speaker, the coefficient of the representative virtual speaker, and a coefficient of the three-dimensional audio signal. If the attribute information is the location information of the representative virtual speaker, determining the coefficient of the representative virtual speaker based on the location information of the representative virtual speaker; and if the attribute information includes the coefficient of the three-dimensional audio signal, obtaining the coefficient of the representative virtual speaker based on the coefficient of the three-dimensional audio signal. Specifically, the virtual speaker signal generation unit 350 calculates the virtual speaker signal based on the coefficient of the three-dimensional audio signal and the coefficient of the representative virtual speaker.

For example, it is assumed that a matrix A represents a coefficient of the virtual speaker, and a matrix X represents a HOA coefficient of an HOA signal. The matrix X is an inverse matrix of the matrix A. The least square method is used to obtain an optimal solution w in theory, and w represents the virtual speaker signal. The virtual speaker signal satisfies formula (5).

$$w=A^{-1}X \quad \text{Formula (5)}$$

$A^{-1}$ represents an inverse matrix of the matrix A. A size of the matrix A is (M×C), C represents a quantity of representative virtual speakers, M represents a quantity of channels of the N-order HOA signal, a represents a coefficient of the representative virtual speaker, a size of matrix X is (M×L), L represents a quantity of coefficients of the HOA signal, and x represents the coefficient of the HOA signal. The coefficient of the representative virtual speaker may indicate an HOA coefficient of the representative virtual speaker or an ambisonics coefficient of the representative virtual speaker. For example:

$$A=\begin{bmatrix} a_{11} & \cdots & a_{1C} \\ \vdots & \ddots & \vdots \\ a_{M1} & \cdots & a_{MC} \end{bmatrix}, \text{ and}$$

$$X=\begin{bmatrix} x_{11} & \cdots & x_{1L} \\ \vdots & \ddots & \vdots \\ x_{M1} & \cdots & x_{ML} \end{bmatrix}.$$

The virtual speaker signal output by the virtual speaker signal generation unit 350 is used as an input of the encoding unit 360.

The encoding unit 360 is configured to perform core encoding processing on the virtual speaker signal to obtain a bitstream. Core encoding processing includes but is not limited to: transformation, quantization, psychoacoustic model, noise shaping, bandwidth expansion, downmixing, arithmetic encoding, and bitstream generation.

It should be noted that a spatial encoder 1131 may include a virtual speaker configuration unit 310, a virtual speaker set generation unit 320, an encoding analysis unit 330, a virtual speaker selection unit 340, and a virtual speaker signal generation unit 350, that is, the virtual speaker configuration unit 310, the virtual speaker set generation unit 320, the encoding analysis unit 330, the virtual speaker selection unit 340, and the virtual speaker signal generation unit 350 implement functions of the spatial encoder 1131. A core encoder 1132 may include an encoding unit 360, that is, the encoding unit 360 implements functions of the core encoder 1132.

The encoder shown in FIG. 3 may generate one virtual speaker signal, or may generate a plurality of virtual speaker signals. The plurality of virtual speaker signals may be obtained by the encoder shown in FIG. 3 by performing a plurality of times, or may be obtained by the encoder shown in FIG. 3 by performing one time.

Figure 4:
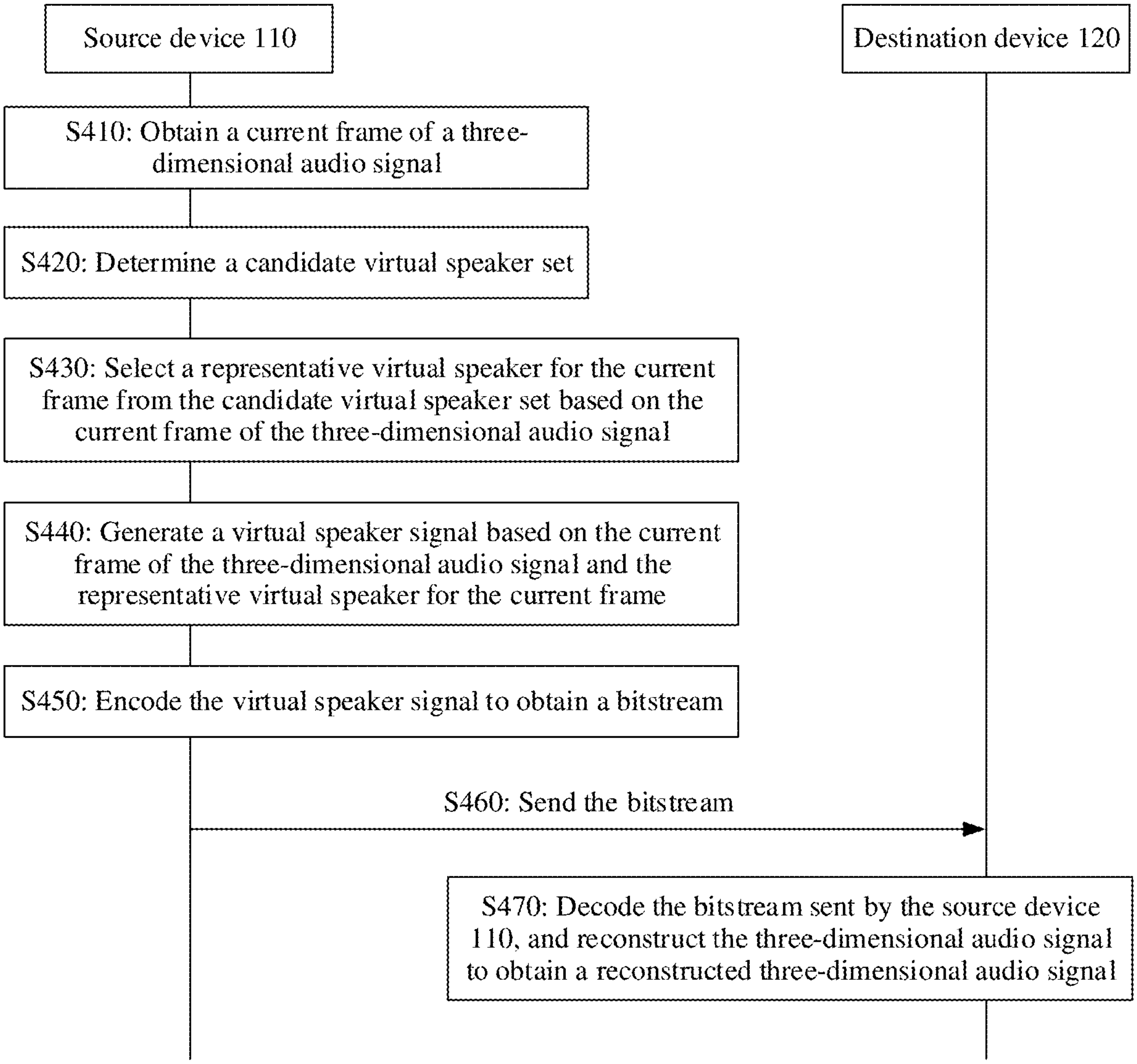
FIG. 4 is a schematic flowchart of a three-dimensional audio signal encoding method according to an embodiment of this application.

The following describes a three-dimensional audio signal coding process with reference to the accompanying drawings. FIG. 4 is a schematic flowchart of a three-dimensional audio signal encoding method according to an embodiment of this application. Herein, a description is provided by using an example in which the source device 110 and the destination device 120 in FIG. 1 perform a three-dimensional audio signal coding process. As shown in FIG. 4, the method includes the following operations.

S410: The source device 110 obtains a current frame of a three-dimensional audio signal.

As described in the foregoing embodiment, if the source device 110 carries the audio obtaining device 111, the source device 110 may acquire original audio by using the audio obtaining device 111. In some embodiments, the source device 110 may alternatively receive original audio acquired by another device, or acquire original audio from a memory in the source device 110 or another memory. The original audio may include at least one of sound in the real world acquired in real time, audio stored in a device, and audio synthesized from a plurality of types of audio. An original audio acquisition method and a type of the original audio are not limited in this embodiment.

After acquiring the original audio, the source device 110 generates a three-dimensional audio signal based on a three-dimensional audio technology and the original audio, to provide immersive sound effect for a listener during playback of the original audio. For a specific three-dimensional audio signal generation method, refer to descriptions of the preprocessor 112 in the foregoing embodiment and descriptions of the conventional technology.

In addition, the audio signal is a continuous analog signal. In an audio signal processing process, the audio signal may be first sampled to generate a digital signal of a frame sequence. A frame may include a plurality of sampling points. The frame may alternatively be a sampling point obtained through sampling. The frame may alternatively include a subframe obtained by dividing the frame. The frame may alternatively be a subframe obtained by dividing the frame. For example, if a length of a frame is L sampling points and the frame is divided into N subframes, each subframe corresponds to L/N sampling points. Audio coding usually indicates processing an audio frame sequence including a plurality of sampling points.

An audio frame may include a current frame or a previous frame. The current frame or the previous frame in embodiments of this application may indicate a frame or a subframe. The current frame indicates a frame on which coding processing is performed at a current moment. The previous frame indicates a frame on which coding processing has been performed at a moment before the current moment. The previous frame may be a frame at a moment before the current moment or frames at a plurality of moments before the current moment. In this embodiment of this application, the current frame of the three-dimensional audio signal indicates a frame of three-dimensional audio signal on which coding processing is performed at the current moment. The previous frame indicates a frame of three-dimensional audio signal on which coding processing has been performed at a moment before the current moment. The current frame of the three-dimensional audio signal may indicate a to-be-encoded current frame of the three-dimensional audio signal. The current frame of the three-dimensional audio signal may be referred to as a current frame for short. The previous frame of the three-dimensional audio signal may be referred to as a previous frame for short.

S420: The source device 110 determines a candidate virtual speaker set.

In one case, the candidate virtual speaker set is preconfigured in a memory of the source device 110. The source device 110 may read the candidate virtual speaker set from the memory. The candidate virtual speaker set includes a plurality of virtual speakers. The virtual speaker represents a virtual speaker virtually existing in a spatial sound field. The virtual speaker is configured to calculate a virtual speaker signal based on the three-dimensional audio signal, so that the destination device 120 plays back a reconstructed three-dimensional audio signal.

In another case, a virtual speaker configuration parameter is preconfigured in the memory of the source device 110. The source device 110 generates the candidate virtual speaker set based on the virtual speaker configuration parameter. In some embodiments, the source device 110 generates the candidate virtual speaker set in real time based on a computing resource (for example, a processor) capability of the source device 110 and a feature (for example, a channel and an amount of data) of the current frame.

For a specific candidate virtual speaker set generation method, refer to the conventional technology and descriptions of the virtual speaker configuration unit 310 and the virtual speaker set generation unit 320 in the foregoing embodiments.

S430: The source device 110 selects a representative virtual speaker for the current frame from the candidate virtual speaker set based on the current frame of the three-dimensional audio signal.

The source device 110 votes for the virtual speaker based on a coefficient of the current frame and a coefficient of the virtual speaker, and selects a representative virtual speaker for the current frame from the candidate virtual speaker set based on a vote value of the virtual speaker. A limited quantity of representative virtual speakers for the current frame are searched from the candidate virtual speaker set as the best matching virtual speaker for the to-be-encoded current frame, to implement data compression on the to-be-encoded three-dimensional audio signal.

Figure 5:
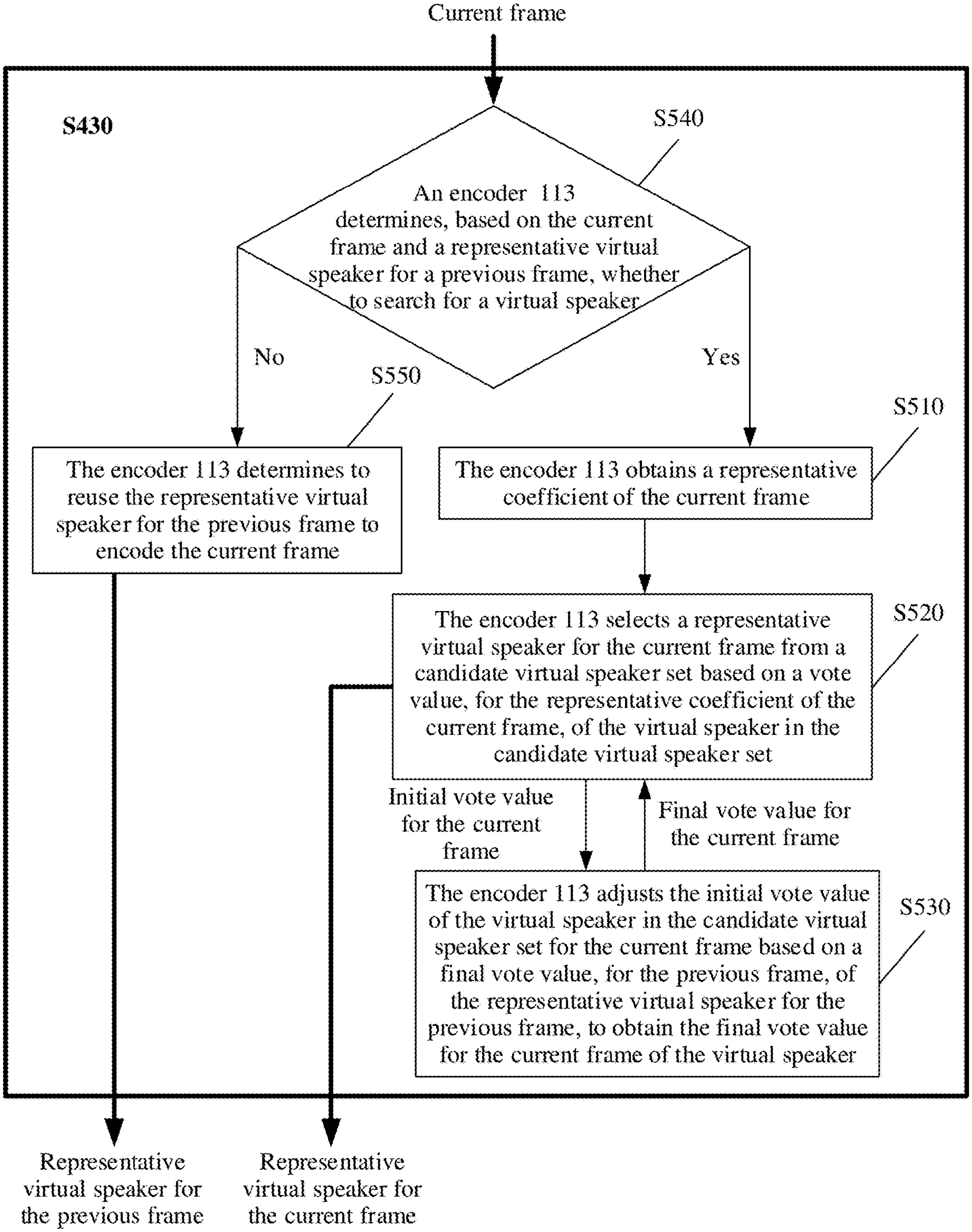
FIG. 5 is a schematic flowchart of a virtual speaker selection method according to an embodiment of this application.

FIG. 5 is a schematic flowchart of a virtual speaker selection method according to an embodiment of this application. The method procedure in FIG. 5 is a description of a specific operation process included in S430 in FIG. 4. Herein, a description is provided by using an example in which the encoder 113 in the source device 110 shown in FIG. 1 performs a virtual speaker selection process. Specifically, functions of the virtual speaker selection unit 340 are implemented. As shown in FIG. 5, the method includes the following operations.

S510: The encoder 113 obtains a representative coefficient of the current frame.

The representative coefficient may indicate a frequency domain representative coefficient or a time domain representative coefficient. The frequency domain representative coefficient may also be referred to as a frequency domain representative frequency or a spectrum representative coefficient. The time domain representative coefficient may also be referred to as a time domain representative sampling point. For a specific method for obtaining the representative coefficient of the current frame, refer to the following descriptions of S650 and S660 in FIG. 8A.

S520: The encoder 113 selects a representative virtual speaker for the current frame from the candidate virtual speaker set based on the vote value, for the representative coefficient of the current frame, of the virtual speaker in the candidate virtual speaker set, that is, performs S440 to S460.

The encoder 113 votes for the virtual speaker in the candidate virtual speaker set based on the representative coefficient of the current frame and the coefficient of the virtual speaker, and selects (searches for) a representative virtual speaker for the current frame from the candidate virtual speaker set based on a final vote value of the current frame of the virtual speaker. For a specific method for selecting a representative virtual speaker for the current frame, refer to the following descriptions of S670 in FIG. 6, FIG. 8B, and FIG. 9B.

It should be noted that the encoder first traverses virtual speakers included in the candidate virtual speaker set, and compresses the current frame by using the representative virtual speaker for the current frame selected from the candidate virtual speaker set. However, if results of selecting virtual speakers for consecutive frames vary greatly, a sound image of a reconstructed three-dimensional audio signal is unstable, and sound quality of the reconstructed three-dimensional audio signal is degraded. In this embodiment of this application, the encoder 113 may update, based on a final vote value that is for a previous frame and that is of a representative virtual speaker for the previous frame, an initial vote value that is for the current frame and that is of a virtual speaker included in the candidate virtual speaker set, to obtain the final vote value of the virtual speaker for the current frame, and then select the representative virtual speaker for the current frame from the candidate virtual speaker set based on the final vote value of the virtual speaker for the current frame. In this way, the representative virtual speaker for the current frame is selected based on the representative virtual speaker for the previous frame. Therefore, when selecting, for the current frame, a representative virtual speaker for the current frame the encoder more tends to select, for the current frame, a virtual speaker that is the same as the representative virtual speaker for the previous frame. This increases orientation continuity between consecutive frames, and overcomes a problem that results of selecting virtual speakers for consecutive frames vary greatly. Therefore, this embodiment of this application may further include S530.

S530: The encoder 113 adjusts the initial vote value of the virtual speaker in the candidate virtual speaker set for the current frame based on the final vote value, for the previous frame, of the representative virtual speaker for the previous frame, to obtain the final vote value of the virtual speaker for the current frame.

After voting for the virtual speaker in the candidate virtual speaker set based on the representative coefficient of the current frame and the coefficient of the virtual speaker to obtain the initial vote value of the current frame of the virtual speaker, the encoder 113 adjusts the initial vote value of the virtual speaker in the candidate virtual speaker set for the current frame based on the final vote value, for the previous frame, of the representative virtual speaker for the previous frame, to obtain the final vote value of the virtual speaker for the current frame. The representative virtual speaker for the previous frame is a virtual speaker used when the encoder 113 encodes the previous frame. For a specific method for adjusting the initial vote value of the virtual speaker in the candidate virtual speaker set for the current frame, refer to the following descriptions of S6702*a* and S6702*b* in FIG. 9B.

In some embodiments, if the current frame is a first frame in original audio, the encoder 113 performs S510 and S520. If the current frame is any frame after a second frame in the original audio, the encoder 113 may first determine whether to reuse the representative virtual speaker for the previous frame to encode the current frame; or determine whether to search for a virtual speaker, so as to ensure orientation continuity between consecutive frames and reduce encoding complexity. This embodiment of this application may further include S540.

S540: The encoder 113 determines, based on the current frame and the representative virtual speaker for the previous frame, whether to search for a virtual speaker.

If determining to search for the virtual speaker, the encoder 113 performs S510 to S530. In some embodiments, the encoder 113 may first perform S510: The encoder 113 obtains the representative coefficient of the current frame.

The encoder 113 determines, based on the representative coefficient of the current frame and a coefficient of the representative virtual speaker for the previous frame, whether to search for a virtual speaker. If determining to search for a virtual speaker, the encoder 113 performs S520 to S530.

If determining not to search for a virtual speaker, the encoder 113 performs S550.

S550: The encoder 113 determines to reuse the representative virtual speaker for the previous frame to encode the current frame.

The encoder 113 reuses the representative virtual speaker for the previous frame and the current frame to generate a virtual speaker signal, encodes the virtual speaker signal to obtain a bitstream, and sends the bitstream to the destination device 120, that is, performs S450 and S460.

Figure 6:
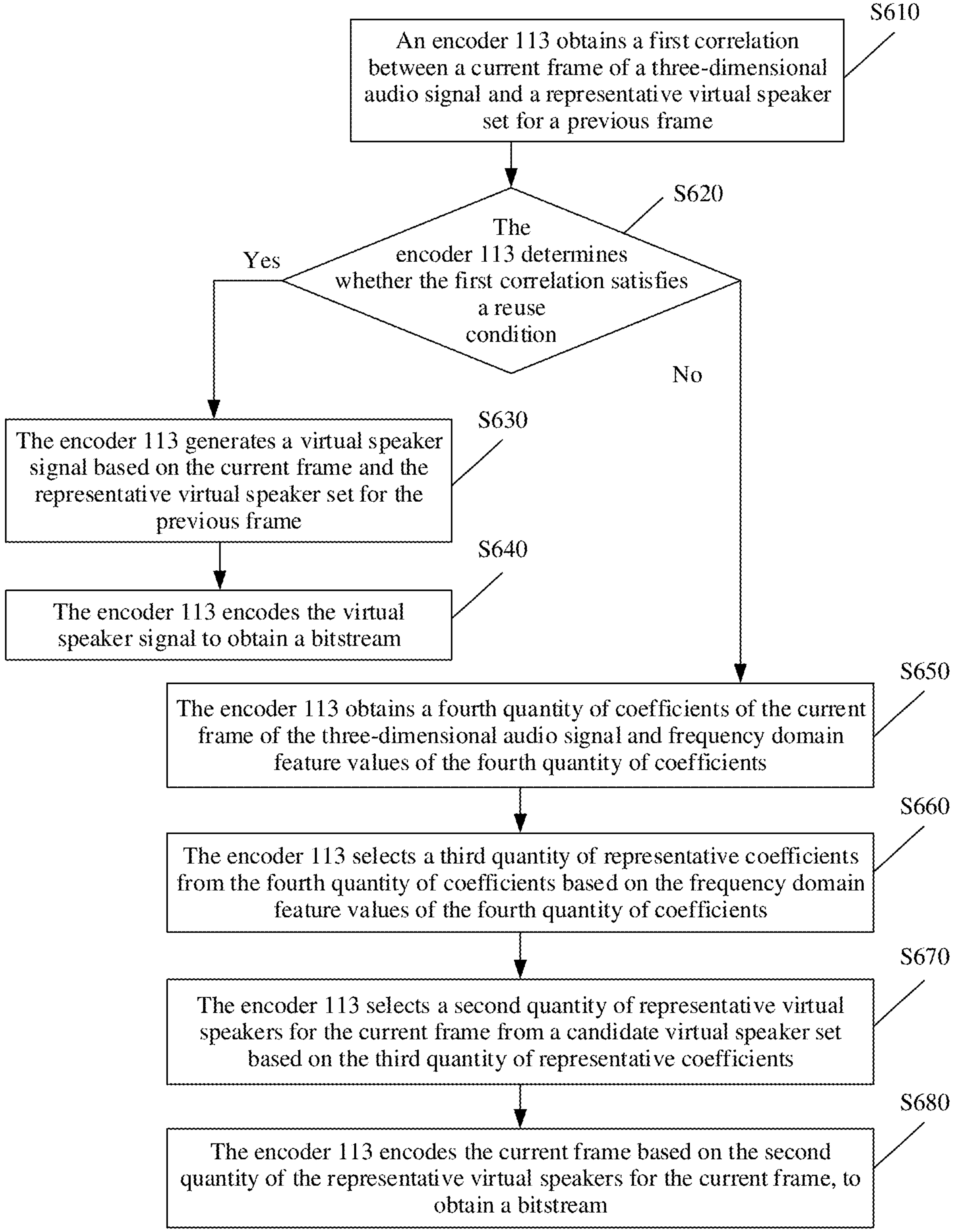
FIG. 6 is a schematic flowchart of a three-dimensional audio signal encoding method according to an embodiment of this application.

For a specific method for determining whether to search for a virtual speaker, refer to descriptions of S610 to S640 in FIG. 6.

S440: The source device 110 generates a virtual speaker signal based on the current frame of the three-dimensional audio signal and the representative virtual speaker for the current frame.

The source device 110 generates the virtual speaker signal based on the coefficient of the current frame and a coefficient of the representative virtual speaker for the current frame. For a specific virtual speaker signal generation method, refer to the conventional technology and the descriptions of the virtual speaker signal generation unit 350 in the foregoing embodiments.

S450: The source device 110 encodes the virtual speaker signal to obtain a bitstream.

The source device 110 may perform an encoding operation such as transformation or quantization on the virtual speaker signal to generate the bitstream, so as to compress data of the to-be-encoded three-dimensional audio signal. For a specific bitstream generation method, refer to the conventional technology and the descriptions of the encoding unit 360 in the foregoing embodiments.

S460: The source device 110 sends the bitstream to the destination device 120.

The source device 110 may send a bitstream of the original audio to the destination device 120 after encoding all the original audio. Alternatively, the source device 110 may encode the three-dimensional audio signal in real time in unit of frames, and send a bitstream of a frame after encoding the frame. For a specific bitstream sending method, refer to the conventional technology and descriptions of the communication interface 114 and the communication interface 124 in the foregoing embodiments.

S470: The destination device 120 decodes the bitstream sent by the source device 110, and reconstructs the three-dimensional audio signal to obtain a reconstructed three-dimensional audio signal.

After receiving the bitstream, the destination device 120 decodes the bitstream to obtain the virtual speaker signal, and then reconstructs the three-dimensional audio signal based on the candidate virtual speaker set and the virtual speaker signal to obtain the reconstructed three-dimensional audio signal. The destination device 120 plays back the reconstructed three-dimensional audio signal. Alternatively, the destination device 120 transmits the reconstructed three-dimensional audio signal to another playing device, and the another playing device plays the reconstructed three-dimensional audio signal, to achieve more vivid immersive sound effect in which the listener feels like being in a cinema, a concert hall, a virtual scene, or the like.

Currently, in a process of searching for a virtual speaker, the encoder uses a result of correlation calculation between a to-be-encoded three-dimensional audio signal and the virtual speaker as a selection measurement indicator of the virtual speaker. In addition, if the encoder transmits one virtual speaker for each coefficient, data cannot be compressed, resulting in heavy calculation load on the encoder. The encoder may first determine whether the representative virtual speaker set for the previous frame can be reused to encode the current frame. If the encoder reuses the representative virtual speaker set for the previous frame to encode the current frame, a process in which the encoder searches for a virtual speaker again is avoided, to effectively reduce calculation complexity of searching for the virtual speaker by the encoder. This reduces calculation complexity of performing compression coding on the three-dimensional audio signal and calculation load of the encoder. If the encoder cannot reuse the representative virtual speaker set for the previous frame to encode the current frame, the encoder selects a representative coefficient again, uses the representative coefficient of the current frame to vote for each virtual speaker in the candidate virtual speaker set, and selects a representative virtual speaker for the current frame based on a vote value, to reduce the calculation complexity of performing compression coding on the three-dimensional audio signal and the calculation load of the encoder.

Next, a virtual speaker selection process is described in detail with reference to the accompanying drawings. FIG. 6 is a schematic flowchart of a three-dimensional audio signal encoding method according to an embodiment of this application. Herein, a description is provided by using an example in which the encoder 113 in the source device 110 in FIG. 1 performs a virtual speaker selection process. The method procedure in FIG. 6 is a description of a specific operation process included in S540 in FIG. 5. As shown in FIG. 6, the method includes the following operations.

S610: The encoder 113 obtains a first correlation between the current frame of the three-dimensional audio signal and the representative virtual speaker set for the previous frame.

The virtual speaker in the representative virtual speaker set for the previous frame is a virtual speaker used for encoding the previous frame of the three-dimensional audio signal. The first correlation is used to determine whether to reuse the representative virtual speaker set for the previous frame when the current frame is encoded. It may be understood that a higher first correlation of the representative virtual speaker set for the previous frame indicates a higher preference of the representative virtual speaker set for the previous frame, and the encoder 113 more tends to select a representative virtual speaker in the previous frame to encode the current frame.

In some embodiments, the encoder 113 may obtain a correlation between the current frame and each representative virtual speaker for the previous frame in the representative virtual speaker set for the previous frame; and sort correlations of representative virtual speakers for the previous frame, and use a largest correlation in the correlations between and the current frame and the representative virtual speakers for the previous frame as the first correlation.

For any one of the representative virtual speakers for the previous frame in the representative virtual speaker set for the previous frame, the encoder 113 may determine the correlation between the current frame and the representative virtual speaker for the previous frame based on the coefficient of the current frame and the coefficient of the representative virtual speaker for the previous frame. It is assumed that the representative virtual speaker set for the previous frame includes a first virtual speaker, and the encoder 113 may determine a correlation between the current frame and the first virtual speaker based on the coefficient of the current frame and a coefficient of the first virtual speaker.

The correlation between the current frame and the virtual speaker satisfies the following formula (6).

$$R_l = \text{abs}(B(\theta,\varphi)\cdot B_l(\theta,\varphi)) \qquad \text{Formula (6)}$$

$B(\theta,\varphi)$ represents a coefficient of the current frame, $B_l(\theta,\varphi)$ represents a coefficient of the representative virtual speaker for the previous frame, l=1, 2, . . . , and Q, and Q represents a quantity of representative virtual speakers for the previous frame in the representative virtual speaker set for the previous frame.

The coefficient of the current frame may be determined based on a ratio of a coefficient value of the coefficient included in the current frame to a quantity of coefficients. The coefficient of the current frame satisfies formula (7).

$$V=\Sigma_{j=1}^{L} x(j)/L \text{ or } V=\Sigma_{j=1}^{L} x(j) \qquad \text{Formula (7)}$$

j=1, 2, . . . , and L, indicating that a value range of j is 1 to L, L indicates a quantity of coefficients of the current frame, and x indicates a coefficient of the current frame.

In some embodiments, the encoder 113 may alternatively select a third quantity of representative coefficients based on the following methods described in S650 and S660, and use a largest representative coefficient in the third quantity of representative coefficients as the coefficient of the current frame for obtaining the first correlation.

S620: The encoder 113 determines whether the first correlation satisfies a reuse condition.

The reuse condition is a basis for the encoder 113 to encode the current frame of the three-dimensional audio signal and reuse the virtual speaker for the previous frame.

If the first correlation satisfies the reuse condition, it indicates that the encoder 113 more tends to select a representative virtual speaker for the previous frame to encode the current frame, and the encoder 113 performs S630 and S640.

If the first correlation does not satisfy the reuse condition, it indicates that the encoder 113 prefers to search for a virtual speaker, and encode the current frame based on the representative virtual speaker for the current frame, and the encoder 113 performs S650 to S680.

In some embodiments, after selecting the third quantity of representative coefficients from a fourth quantity of coefficients based on frequency domain feature values of the fourth quantity of coefficients, the encoder 113 may also use a largest representative coefficient in the third quantity of representative coefficients as the coefficient of the current frame for obtaining the first correlation, and the encoder 113 obtains the first correlation between the largest representative coefficient in the third quantity of representative coefficients of the current frame and the representative virtual speaker set for the previous frame. If the first correlation does not satisfy the reuse condition, S660 is performed, that is, the encoder 113 selects the third quantity of representative coefficients from the fourth quantity of coefficients based on the frequency domain feature values of the fourth quantity of coefficients.

S630: The encoder 113 generates a virtual speaker signal based on the current frame and the representative virtual speaker set for the previous frame.

The encoder 113 generates the virtual speaker signal based on the coefficient of the current frame and the coefficient of the representative virtual speaker for the previous frame. For a specific virtual speaker signal generation method, refer to the conventional technology and the descriptions of the virtual speaker signal generation unit 350 in the foregoing embodiments.

S640: The encoder 113 encodes the virtual speaker signal to obtain the bitstream.

The encoder 113 may perform an encoding operation such as conversion or quantization on the virtual speaker signal to generate the bitstream, and send the bitstream to the destination device 120. In this way, data compression on the to-be-encoded three-dimensional audio signal is implemented. For a specific bitstream generation method, refer to the conventional technology and the descriptions of the encoding unit 360 in the foregoing embodiments.

This embodiment of this application provides two possible embodiments in which the encoder 113 determines whether the first correlation satisfies the reuse condition. The following separately describes the two embodiments in detail.

In a first possible embodiment, the encoder 113 compares the first correlation with a correlation threshold. If the first correlation is greater than the correlation threshold, the encoder 113 encodes the current frame based on the representative virtual speaker for the previous frame included in the representative virtual speaker set for the previous frame, to generate the bitstream, that is, performs S630 and S640. If the first correlation is less than or equal to the correlation threshold, the encoder 113 selects a representative virtual speaker for the current frame from the candidate virtual speaker set, that is, performs S650 to S680. The reuse condition includes: The first correlation is greater than the correlation threshold. The correlation threshold may be preconfigured.

In a second possible embodiment, the encoder 113 may further obtain a correlation between the current frame and the virtual speaker included in the candidate virtual speaker set, and determine, based on the first correlation and the correlation of the virtual speakers included in the candidate virtual speaker set, whether to reuse the representative virtual speaker set for the previous frame to encode the current frame.

Figure 7A:
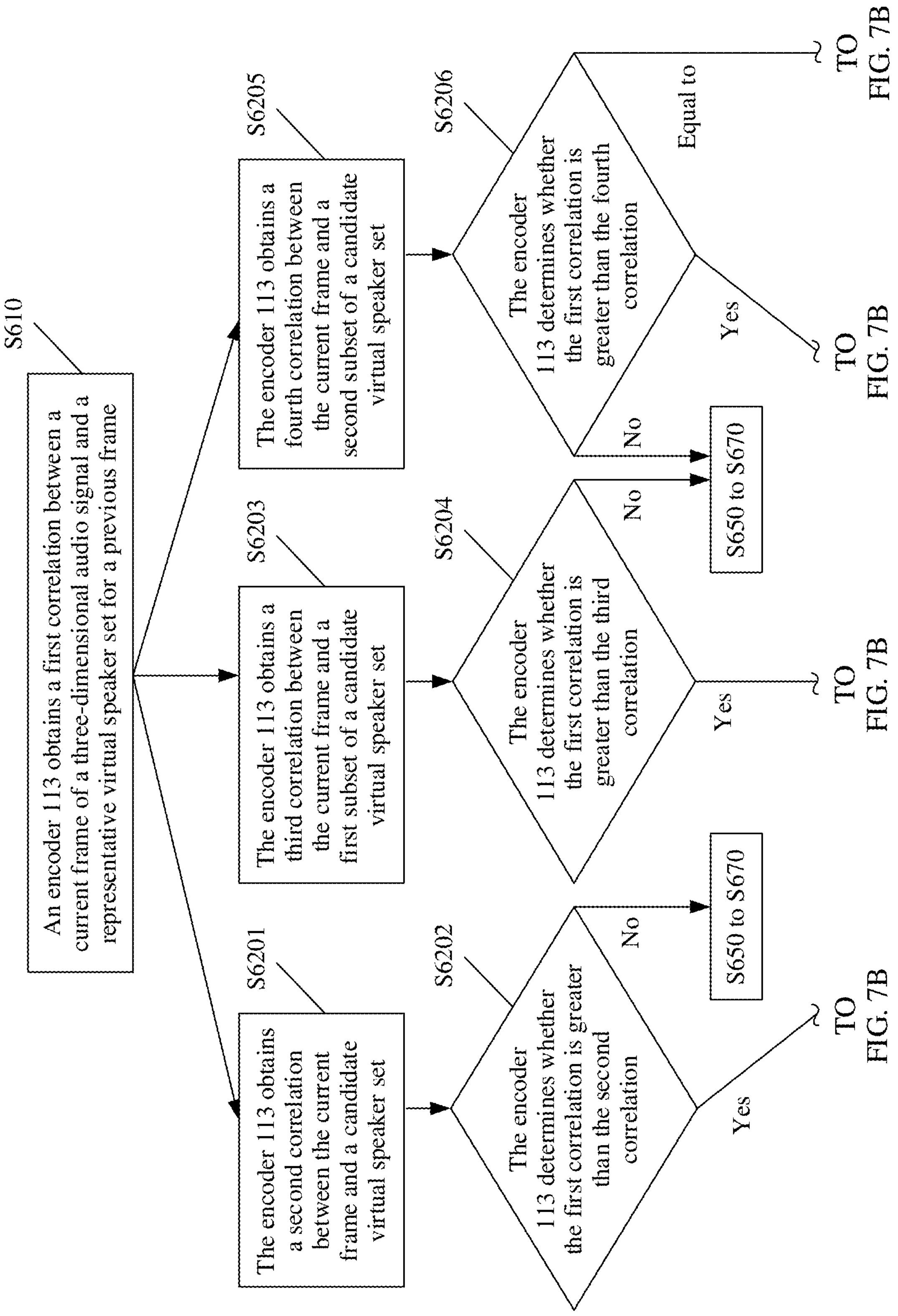
FIG. 7A and FIG. 7B are a schematic flowchart of another virtual speaker selection method according to an embodiment of this application.
Figure 7B:
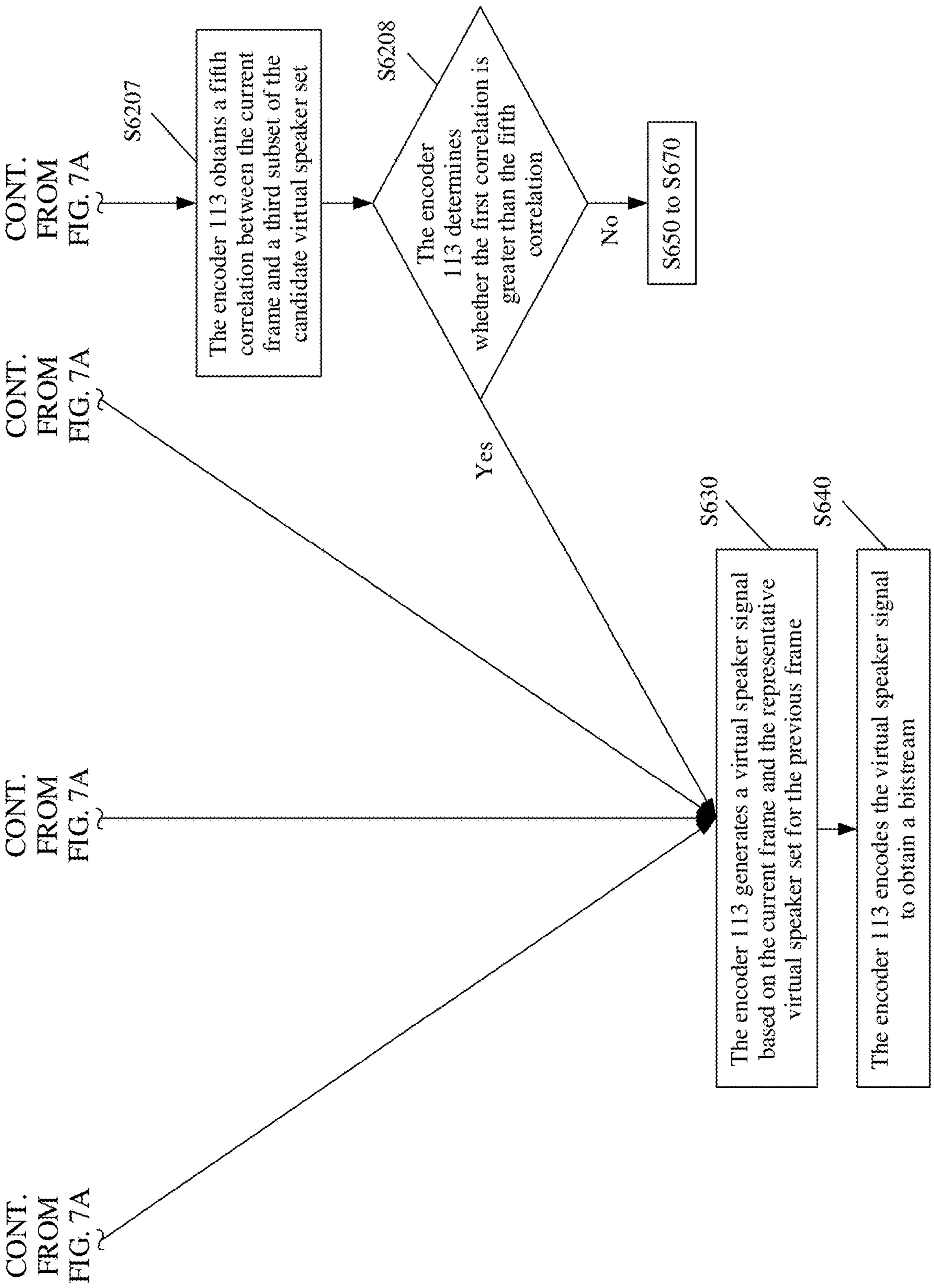

FIG. 7A and FIG. 7B are a schematic flowchart of a method for determining whether to search for a virtual speaker according to an embodiment of this application. The method procedure in FIG. 7A and FIG. 7B is a description of a specific operation process included in S620 in FIG. 6. After the encoder 113 obtains the first correlation between the current frame of the three-dimensional audio signal and the representative virtual speaker for the previous frame, that is, after S650, the encoder 113 may further perform S6201 and S6202, or perform S6203 and S6204, or perform S6205 to S6208.

S6201: The encoder 113 obtains a second correlation between the current frame and the candidate virtual speaker set.

The second correlation represents a priority of using the candidate virtual speaker set when the current frame is encoded. It may be understood that a higher second correlation of the candidate virtual speaker set indicates a higher priority or a higher preference of the candidate virtual speaker set, and the encoder 113 more tends to select the candidate virtual speaker set to encode the current frame.

The representative virtual speaker set for the previous frame is a proper subset of the candidate virtual speaker set, indicating that the candidate virtual speaker set includes the representative virtual speaker set for the previous frame, the candidate virtual speaker set and the representative virtual speaker set are not equal, and all representative virtual speakers for the previous frame included in the representative virtual speaker set for the previous frame belong to the candidate virtual speaker set.

In some embodiments, the encoder 113 may obtain a correlation between the current frame and each candidate virtual speaker in the candidate virtual speaker set; and sort correlations of candidate virtual speakers, and use a largest correlation in the correlations between the current frame and the candidate virtual speakers as the second correlation.

For any candidate virtual speaker in the candidate virtual speaker set, the encoder 113 may determine the correlation between the current frame and the candidate virtual speaker based on the coefficient of the current frame and the coefficient of the candidate virtual speaker. The correlation between the current frame and the candidate virtual speaker satisfies formula (6). It should be noted that $B_l(\theta,\varphi)$ may also represent a coefficient of the candidate virtual speaker, and Q may also represent a quantity of candidate virtual speakers in the candidate virtual speaker set.

S6202: The encoder 113 determines whether the first correlation is greater than the second correlation.

If the first correlation is greater than the second correlation, the encoder 113 performs S630 and S640.

If the first correlation is less than or equal to the second correlation, the encoder 113 performs S650 to S680.

The reuse condition includes: The first correlation is greater than the second correlation.

In another case, the encoder 113 may further obtain a correlation between the current frame and a virtual speaker included in a subset of the candidate virtual speaker set, and determine, based on the first correlation and the correlation of the virtual speaker included in the subset of the candidate virtual speaker set, whether to reuse the representative virtual speaker set for the previous frame to encode the current frame. S6203 and S6204 are performed.

S6203: The encoder 113 obtains a third correlation between the current frame and a first subset of the candidate virtual speaker set.

The third correlation represents a priority of using the first subset of the candidate virtual speaker set when the current frame is encoded. It may be understood that a higher third correlation of the first subset of the candidate virtual speaker set indicates a higher priority or a higher preference of the first subset of the candidate virtual speaker set, and the encoder 113 more tends to select the first subset of the candidate virtual speaker set to encode the current frame.

The first subset is a proper subset of the candidate virtual speaker set, indicating that the candidate virtual speaker set includes the first subset, and all candidate virtual speakers included in the first subset belong to the candidate virtual speaker set.

In some embodiments, the encoder 113 may obtain a correlation between the current frame and each candidate virtual speaker in the first subset of the candidate virtual speaker set; and sort correlations of candidate virtual speakers, and use a largest correlation in the correlations between the current frame and the candidate virtual speakers as the third correlation.

For any candidate virtual speaker in the first subset of the candidate virtual speaker set, the encoder 113 may determine the correlation between the current frame and the candidate virtual speaker based on the coefficient of the current frame and the coefficient of the candidate virtual speaker. The correlation between the current frame and the candidate virtual speaker satisfies formula (6). It should be noted that $B_l(\theta,\varphi)$ may also represent a coefficient of the candidate virtual speaker in the first subset, and Q may also represent a quantity of candidate virtual speakers in the first subset of the candidate virtual speaker set.

S6204: The encoder 113 determines whether the first correlation is greater than the third correlation.

If the first correlation is greater than the third correlation, the encoder 113 performs S630 and S640.

If the first correlation is less than or equal to the third correlation, the encoder 113 performs S650 to S680.

The reuse condition includes: The first correlation is greater than the third correlation.

In another case, the encoder 113 may further obtain a correlation between the current frame and a virtual speaker included in a plurality of subsets of the candidate virtual speaker set, and perform, based on the first correlation and the correlation of virtual speakers included in the plurality of subsets of the candidate virtual speaker set, a plurality of rounds of determining whether to reuse the representative virtual speaker set for the previous frame to encode the current frame. S6205 to S6208 are performed.

S6205: The encoder 113 obtains a fourth correlation between the current frame and a second subset of the candidate virtual speaker set.

The fourth correlation represents a priority of using the second subset of the candidate virtual speaker set when the current frame is encoded. It may be understood that a higher fourth correlation of the second subset of the candidate virtual speaker set indicates a higher priority or a higher preference of the second subset of the candidate virtual speaker set, and the encoder 113 more tends to select the second subset of the candidate virtual speaker set to encode the current frame.

The second subset is a proper subset of the candidate virtual speaker set, indicating that the candidate virtual speaker set includes the second subset, and all candidate virtual speakers included in the second subset belong to the candidate virtual speaker set.

For a specific method in which the encoder 113 obtains the fourth correlation degree between the current frame and the second subset of the candidate virtual speaker set, refer to the description in S6203.

S6206: The encoder 113 determines whether the first correlation is greater than the fourth correlation.

If the first correlation is greater than the fourth correlation, the encoder 113 performs S630 and S640. The reuse condition includes: The first correlation is greater than the fourth correlation.

If the first correlation is less than the fourth correlation, the encoder 113 performs S650 to S680.

If the first correlation is equal to the fourth correlation, the encoder 113 performs S6207 and S6208. It may be understood that the encoder 113 may further continue to select another subset from the candidate virtual speaker set, and determine whether the first correlation of the another subset satisfies the reuse condition.

S6207: The encoder 113 obtains a fifth correlation between the current frame and a third subset of the candidate virtual speaker set.

The fifth correlation represents a priority of using the third subset of the candidate virtual speaker set when the current frame is encoded. It may be understood that a higher fifth correlation of the third subset of the candidate virtual speaker set indicates a higher priority or a higher preference of the third subset of the candidate virtual speaker set, and the encoder 113 more tends to select the third subset of the candidate virtual speaker set to encode the current frame.

The third subset is a proper subset of the candidate virtual speaker set, indicating that the candidate virtual speaker set includes the third subset, and all candidate virtual speakers included in the third subset belong to the candidate virtual speaker set.

For a specific method in which the encoder 113 obtains the fifth correlation between the current frame and the third subset of the candidate virtual speaker set, refer to the description in S6203.

A virtual speaker included in the second subset and a virtual speaker included in the third subset are all or partially different. For example, the second subset includes a first virtual speaker and a second virtual speaker, and the third subset includes a third virtual speaker and a fourth virtual speaker. For another example, the second subset includes a first virtual speaker and a second virtual speaker, and the third subset includes the first virtual speaker and a fourth virtual speaker.

S6208: The encoder 113 determines whether the first correlation is greater than the fifth correlation.

If the first correlation is greater than the fifth correlation, the encoder 113 performs S630 and S640. The reuse condition includes: The first correlation is greater than the fifth correlation.

If the first correlation is less than the fifth correlation, the encoder 113 performs S650 to S680.

If the first correlation is equal to the fifth correlation, the encoder 113 performs S6207 and S6208. It may be understood that the encoder 113 may further continue to select another subset from the candidate virtual speaker set, and determine whether the first correlation of the another subset satisfies the reuse condition.

In some embodiments, if the first correlation is equal to the fifth correlation, the encoder 113 may use a second largest correlation in the correlations between the current frame and the representative virtual speakers for the previous frame and as the first correlation, and obtain a sixth correlation between the current frame and a fourth subset of the candidate virtual speaker set. If the first correlation is greater than the sixth correlation, the encoder 113 performs S630 and S640. The reuse condition includes: The first correlation is greater than the sixth correlation. If the first correlation is less than the sixth correlation, the encoder 113 performs S650 to S680. If the first correlation is equal to the sixth correlation, the encoder 113 may continue to select another subset from the candidate virtual speaker set, and determine whether the first correlation of the another subset satisfies the reuse condition.

It should be noted that, in this embodiment of this application, a quantity of determining rounds of encoding the current frame by reusing the representative virtual speaker for the previous frame is not limited. In addition, a quantity of correlation values used in each round of determining is not limited.

In addition, a subset selected by the encoder 113 from the candidate virtual speaker set may be preset. Alternatively, the encoder 113 evenly samples the candidate virtual speaker set to obtain the subset of the candidate virtual speaker set. For example, the encoder 113 may select 1/10 virtual speakers from the candidate virtual speaker set as the subset of the candidate virtual speaker set. A quantity of virtual speakers included in the subset of the candidate virtual speaker set selected in each round is not limited. For example, a quantity of virtual speakers included in a subset of the $(i+1)^{th}$ round is greater than a quantity of virtual speakers included in a subset of the $i^{th}$ round. For another example, the virtual speakers included in the subset of the $(i+1)^{th}$ round may be K virtual speakers near space in which the virtual speakers included in the subset of the $i^{th}$ round are located. For example, the subset of the $i^{th}$ round includes 64 virtual speakers, K=32, and the subset of the $(i+1)^{th}$ round includes a part of 64×32 virtual speakers.

According to the virtual speaker selection method provided in this embodiment of this application, whether to search for a virtual speaker is determined by using a correlation between a representative coefficient of the current frame and a representative virtual speaker for the previous frame. This effectively reduces complexity of the encoder side while ensuring accuracy of selecting the correlation of the representative virtual speaker for the current frame.

Generally, there are 2048 virtual speakers in a typical configuration. In a process of searching for the virtual speaker, the encoder needs to perform 2048 voting operations on each coefficient of the current frame. According to the method for determining whether to search for the virtual speaker provided in this embodiment of this application, more than 50% of virtual speaker search operations can be skipped, and a coding rate of the encoder is increased. For example, the encoder pre-computes a grid of a group of 64 virtual speakers that are approximately evenly distributed on the sphere, referred to as a coarse scanning grid. Coarse scanning is performed on each virtual speaker on the coarse scanning grid to find a candidate virtual speaker on the coarse scanning grid, and then a second round of fine scanning is performed on the candidate virtual speaker to obtain a final best matching virtual speaker. After the algorithm is used for acceleration, the quantity of scanning times is reduced from 2048 to 128 (64+64=128), and the algorithm is accelerated by 16 times (2048/128=16).

The following describes in detail a process in which the encoder 113 continues to search for a virtual speaker, obtains a representative virtual speaker for the current frame, and encodes the current frame based on the representative virtual speaker for the current frame when the first correlation does not satisfy the reuse condition. After S620, the encoder 113 may further perform S650 to S680. According to the virtual speaker selection method provided in this embodiment of this application, the encoder votes for each virtual speaker in the candidate virtual speaker set by using a representative coefficient of the current frame, and selects a representative virtual speaker for the current frame based on a vote value, to reduce calculation complexity of virtual speaker search and calculation load of the encoder.

S650: The encoder 113 obtains a fourth quantity of coefficients of the current frame of the three-dimensional audio signal and frequency domain feature values of the fourth quantity of coefficients.

It is assumed that the three-dimensional audio signal is an HOA signal, the encoder 113 may sample a current frame of the HOA signal to obtain $L\times(N+1)^2$ sampling points, that is, obtain the fourth quantity of coefficients. N indicates an order of the HOA signal. For example, it is assumed that duration of the current frame of the HOA signal is 20 milliseconds, and the encoder 113 samples the current frame based on 48 kHz frequency, to obtain $960\times(N+1)^2$ sampling points in time domain. The sampling point may also be referred to as a time domain coefficient.

A frequency domain coefficient of the current frame of the three-dimensional audio signal may be obtained by performing time-frequency conversion based on the time domain coefficient of the current frame of the three-dimensional audio signal. A method for converting time domain to frequency domain is not limited. The method for converting time domain to frequency domain is, for example, a modified discrete cosine transform (modified discrete cosine transform, MDCT), and $960\times(N+1)^2$ frequency domain coefficients in frequency domain may be obtained. The frequency domain coefficient may also be referred to as a spectrum coefficient or a frequency.

The frequency domain feature value of the sampling point satisfies p(j)=norm(x(j)), j=1, 2, . . . , and L, L represents a quantity of sampling moments, x represents a frequency domain coefficient of the current frame of the three-dimensional audio signal, for example, an MDCT coefficient, norm is an operation of obtaining a binary norm, and x(j) represents frequency domain coefficients of $(N+1)^2$ sampling points at a $j^{th}$ sampling moment.

S660: The encoder 113 selects a third quantity of representative coefficients from the fourth quantity of coefficients based on the frequency domain feature values of the fourth quantity of coefficients.

The encoder 113 divides a spectral range indicated by the fourth quantity of coefficients into at least one subband. The encoder 113 divides a spectral range indicated by the fourth quantity of coefficients into one subband. It may be understood that a spectral range of the subband is equal to the spectral range indicated by the fourth quantity of coefficients. This is equivalent to that the encoder 113 does not divide the spectral range indicated by the fourth quantity of coefficients.

If the encoder 113 divides the spectral range indicated by the fourth quantity of coefficients into at least two frequency subbands, in one case, the encoder 113 equally divides the spectral range indicated by the fourth quantity of coefficients into at least two subbands, and a quantity of coefficients included in each of the at least two subbands is the same.

In another case, the encoder 113 unequally divides the spectral range indicated by the fourth quantity of coefficients, and quantities of coefficients included in at least two subbands obtained through division are different, or quantities of coefficients included in each of the at least two subbands obtained through division are different. For example, the encoder 113 may unequally divide, based on a low frequency range, an intermediate frequency range, and a high frequency range in the spectral range indicated by the fourth quantity of coefficients, the spectral range indicated by the fourth quantity of coefficients, so that each spectral range in the low frequency range, the intermediate frequency range, and the high frequency range includes at least one subband. A quantity of coefficients included in each of the at least one subband in the low frequency range is the same. A quantity of coefficients included in each of the at least one subband in the intermediate frequency range is the same. A quantity of coefficients included in each of the at least one subband in the high frequency range is the same. Subbands in three spectral ranges of the low frequency range, the intermediate frequency range, and the high frequency range may include different quantities of coefficients.

Further, the encoder 113 selects, based on the frequency domain feature values of the fourth quantity of coefficients, a representative coefficient from the at least one subband included in the spectral range indicated by the fourth quantity of coefficients, to obtain the third quantity of coefficients. The third quantity is less than the fourth quantity, and the fourth quantity of coefficients include the third quantity of representative coefficients.

For example, the encoder 113 separately selects Z representative coefficients from each subband based on a descending order of frequency domain feature values of coefficients in each subband in the at least one subband included in the spectral range indicated by the fourth quantity of coefficients, and combines the Z representative coefficients in the at least one subband to obtain the third quantity of representative coefficients, and Z is a positive integer.

For another example, when the at least one subband includes at least two subbands, the encoder 113 determines a weight of each subband based on a frequency domain feature value of a first candidate coefficient in each subband of the at least two subbands; and adjusts a frequency domain feature value of a second candidate coefficient in each subband based on the weight of each subband, to obtain an adjusted frequency domain feature value of the second candidate coefficient in each subband. The first candidate coefficient and the second candidate coefficient are a part of coefficients in the subband. The encoder 113 determines the third quantity of representative coefficients based on the adjusted frequency domain feature value of the second candidate coefficient in the at least two subbands and a frequency domain feature value of a coefficient other than the second candidate coefficient in the at least two subbands.

Because the encoder selects a part of coefficients from all coefficients of the current frame as representative coefficients, and selects a representative virtual speaker from the candidate virtual speaker set by using a small quantity of representative coefficients instead of all the coefficients of the current frame, the calculation complexity of searching for the virtual speaker by the encoder is effectively reduced. This reduces the calculation complexity of performing compression coding on the three-dimensional audio signal and the calculation load of the encoder.

S670: The encoder 113 selects a second quantity of representative virtual speakers for the current frame from the candidate virtual speaker set based on the third quantity of representative coefficients.

The encoder 113 performs a correlation operation by using the third quantity of representative coefficients of the current frame of the three-dimensional audio signal and the coefficients of each virtual speaker in the candidate virtual speaker set, and selects the second quantity of representative virtual speakers for the current frame.

Because the encoder selects a part of coefficients from all coefficients of the current frame as representative coefficients, and selects a representative virtual speaker from the candidate virtual speaker set by using a small quantity of representative coefficients instead of all the coefficients of the current frame, the calculation complexity of searching for the virtual speaker by the encoder is effectively reduced. This reduces the calculation complexity of performing compression coding on the three-dimensional audio signal and the calculation load of the encoder. For example, a frame of N-order HOA signals has $960\times(N+1)^2$ coefficients. In this embodiment, first 10% coefficients may be selected to participate in virtual speaker search. Encoding complexity in this case is reduced by 90% compared with encoding complexity of all coefficient participating in virtual speaker search.

S680: The encoder 113 encodes the current frame based on the second quantity of the representative virtual speakers for the current frame, to obtain a bitstream.

The encoder 113 generates a virtual speaker signal based on the second quantity of representative virtual speakers for the current frame and the current frame; and encodes the virtual speaker signal, to obtain the bitstream. For a specific bitstream generation method, refer to the conventional technology and the descriptions of the encoding unit 360 and S450 in the foregoing embodiments.

After generating the bitstream, the encoder 113 sends the bitstream to the destination device 120. In this way, the destination device 120 decodes the bitstream sent by the source device 110, and reconstructs the three-dimensional audio signal to obtain a reconstructed three-dimensional audio signal.

Because the frequency domain feature value of the coefficient of the current frame represents a sound field characteristic of the three-dimensional audio signal, the encoder selects, based on the frequency domain feature value of the coefficient of the current frame, a representative coefficient that is of the current frame and that has a representative sound field component, and the representative virtual speaker for the current frame selected from the candidate virtual speaker set by using the representative coefficient can fully represent the sound field characteristic of the three-dimensional audio signal. Therefore, accuracy of generating the virtual speaker signal when the encoder performs compression coding on a to-be-encoded three-dimensional audio signal by using the representative virtual speaker for the current frame is further improved. This helps improve a compression ratio of performing compression coding on the three-dimensional audio signal, and reduce a bandwidth occupied by the encoder to transmit the bitstream.

Figure 8A:
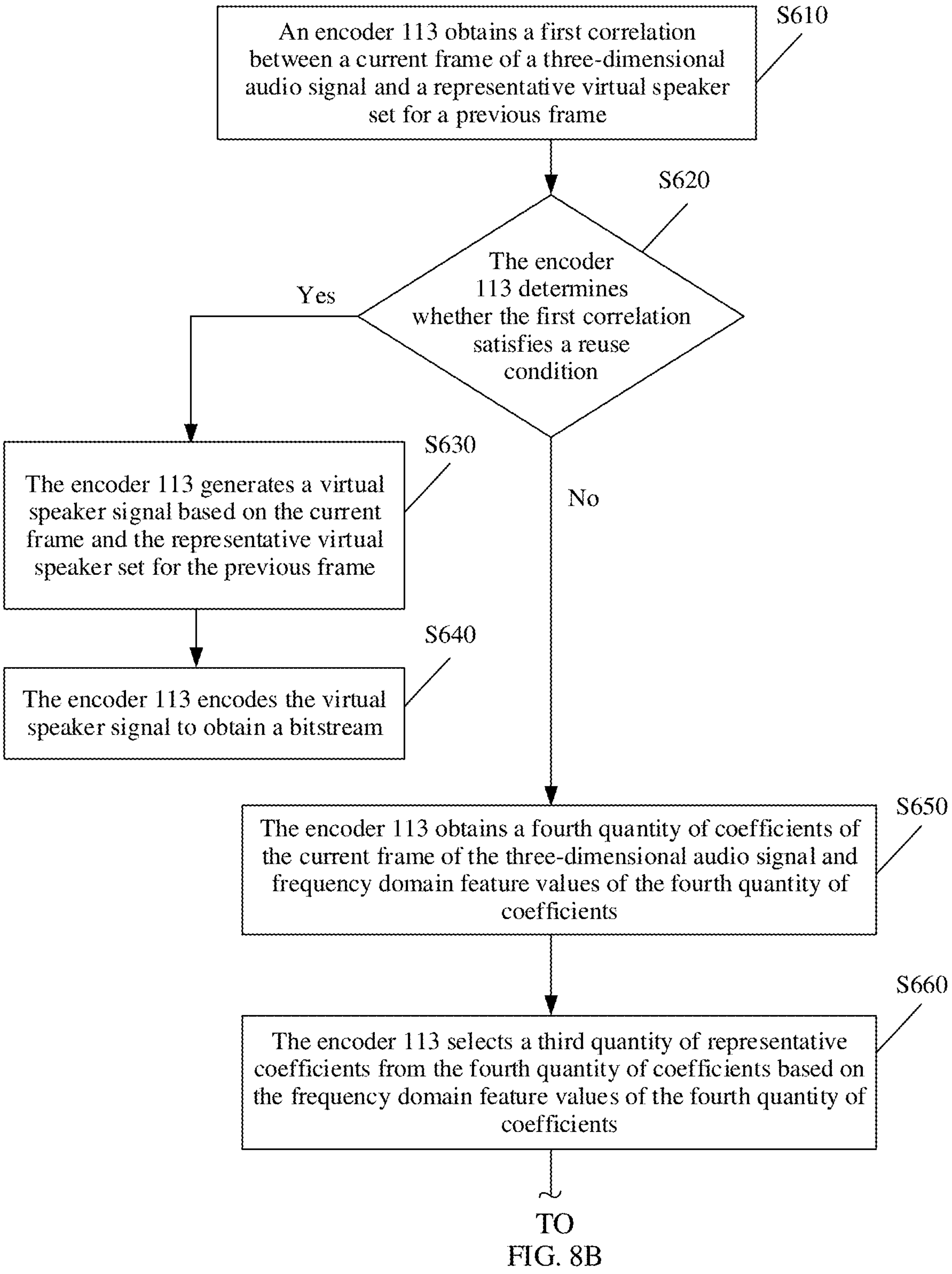
FIG. 8A and FIG. 8B are a schematic flowchart of another virtual speaker selection method according to an embodiment of this application.
Figure 8B:
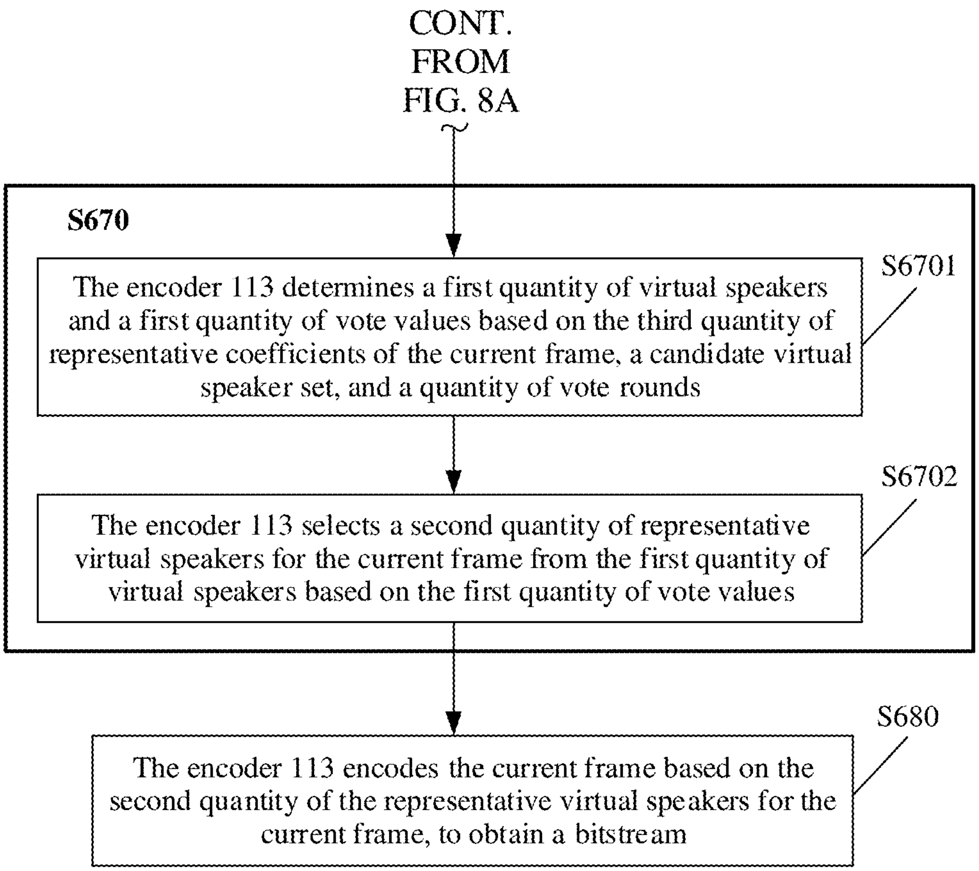

FIG. 8A and FIG. 8B are a schematic flowchart of another three-dimensional audio signal encoding method according to an embodiment of this application. Herein, a description is provided by using an example in which the encoder 113 in the source device 110 in FIG. 1 performs a virtual speaker selection process. The method procedure in FIG. 8A and FIG. 8B is a description of a specific operation process included in S670 in FIG. 6. As shown in FIG. 8A and FIG. 8B, the method includes the following operations.

S6701: The encoder 113 determines a first quantity of virtual speakers and a first quantity of vote values based on the third quantity of representative coefficients of the current frame, the candidate virtual speaker set, and a quantity of vote rounds.

The quantity of vote rounds is used to limit a quantity of vote times for the virtual speaker. The quantity of vote rounds is an integer greater than or equal to 1, the quantity of vote rounds is less than or equal to a quantity of virtual speakers included in the candidate virtual speaker set, and the quantity of vote round is less than or equal to a quantity of virtual speaker signals transmitted by the encoder. For example, the candidate virtual speaker set includes a fifth quantity of virtual speakers, the fifth quantity of virtual speakers include the first quantity of virtual speakers, the first quantity is less than or equal to the fifth quantity, the quantity of vote rounds is an integer greater than or equal to 1, and the quantity of vote rounds is less than or equal to the fifth quantity. The virtual speaker signal also indicates a transmission channel that is of a representative virtual speaker for the current frame and that corresponds to the current frame. Generally, the quantity of virtual speaker signals is less than or equal to the quantity of virtual speakers.

In a possible embodiment, the quantity of vote rounds may be preconfigured, or may be determined based on a computing capability of the encoder. For example, the quantity of vote rounds is determined based on a coding rate and/or an encoding application scenario of the encoder.

In another possible embodiment, the quantity of vote rounds is determined based on a quantity of directional sound sources in the current frame. For example, when a quantity of directional sound sources in a sound field is 2, a quantity of vote rounds is set to 2.

This embodiment of this application provides three possible embodiments of determining the first quantity of virtual speakers and the first quantity of vote values. The following separately describes the three manners in detail.

In a first possible embodiment, the quantity of vote rounds is equal to 1. After sampling a plurality of representative coefficients, the encoder 113 obtains vote values of each representative coefficient of the current frame for all virtual speakers in the candidate virtual speaker set, and accumulates vote values of virtual speakers with a same number, to obtain the first quantity of virtual speakers and the first quantity of vote values. It may be understood that the candidate virtual speaker set includes a first quantity of virtual speakers. The first quantity is equal to the quantity of virtual speakers included in the candidate virtual speaker set. It is assumed that the candidate virtual speaker set includes a fifth quantity of virtual speakers, and the first quantity is equal to the fifth quantity. The first quantity of vote values include vote values of all the virtual speakers in the candidate virtual speaker set. The encoder 113 may use the first quantity of vote values as final vote values of the current frame of the first quantity of virtual speakers, and perform S6702, that is, the encoder 113 selects a second quantity of representative virtual speakers for the current frame from the first quantity of virtual speakers based on the first quantity of vote values.

The virtual speakers are in a one-to-one correspondence with the vote values, that is, one virtual speaker corresponds to one vote value. For example, the first quantity of virtual speakers include a first virtual speaker, the first quantity of vote values include a vote value of the first virtual speaker, and the first virtual speaker corresponds to the vote value of the first virtual speaker. The vote value of the first virtual speaker represents a priority of using the first virtual speaker when the current frame is encoded. The priority may also be replaced with a preference, that is, the vote value of the first virtual speaker represents a preference of using the first virtual speaker when the current frame is encoded. It may be understood that a larger vote value of the first virtual speaker indicates a higher priority or a higher preference of the first virtual speaker. Compared with a virtual speaker whose vote value is smaller than the vote value of the first virtual speaker in the candidate virtual speaker set, the encoder 113 more tends to select the first virtual speaker to encode the current frame.

A difference between a second possible embodiment and the foregoing first possible embodiment lies in that, after obtaining the vote values of each representative coefficient of the current frame for all the virtual speakers in the candidate virtual speaker set, the encoder 113 selects a part of vote values from the vote values of each representative coefficient for all the virtual speakers in the candidate virtual speaker set, and accumulates vote values of virtual speakers with a same number in the virtual speakers corresponding to the part of vote values, to obtain the first quantity of virtual speakers and the first quantity of vote values. It may be understood that the candidate virtual speaker set includes the first quantity of virtual speakers. The first quantity is less than or equal to the quantity of virtual speakers included in the candidate virtual speaker set. The first quantity of vote values include vote values of a part of virtual speakers included in the candidate virtual speaker set, or the first quantity of vote values include vote values of all virtual speakers included in the candidate virtual speaker set.

A difference between a third possible embodiment and the second possible embodiment lies in that, the quantity of vote rounds is an integer greater than or equal to 2, and for each representative coefficient of the current frame, the encoder 113 performs at least two rounds of voting on all the virtual speakers in the candidate virtual speaker set, and selects a virtual speaker with a largest vote value in each round. After at least two rounds of voting are performed on all virtual speakers by using each representative coefficient of the current frame, vote values of virtual speakers with a same number are accumulated, to obtain the first quantity of virtual speakers and the first quantity of vote values.

S6702: The encoder 113 selects a second quantity of representative virtual speakers for the current frame from the first quantity of virtual speakers based on the first quantity of vote values.

The encoder 113 selects the second quantity of representative virtual speakers for the current frame from the first quantity of virtual speakers based on the first quantity of vote values, and vote values of the second quantity of representative virtual speakers for the current frame are greater than a preset threshold.

The encoder 113 may alternatively select the second quantity of representative virtual speakers for the current frame from the first quantity of virtual speakers based on the first quantity of vote values. For example, the second quantity of vote values are determined from the first quantity of vote values in descending order of the first quantity of vote values, and virtual speakers corresponding to the second quantity of vote values in the first quantity of virtual speakers are used as the second quantity of representative virtual speakers for the current frame.

In some embodiments, if vote values of virtual speakers with different numbers in the first quantity of virtual speakers are the same, and the vote values of the different virtual speakers are greater than the preset threshold, the encoder 113 may use all the virtual speakers with different numbers as representative virtual speakers for the current frame.

It should be noted that the second quantity is less than the first quantity. The first quantity of virtual speakers includes the second quantity of representative virtual speakers for the current frame. The second quantity may be preset, or the second quantity may be determined based on a quantity of sound sources in the sound field of the current frame. For example, the second quantity may be directly equal to the quantity of sound sources in the sound field of the current frame, or the quantity of sound sources in the sound field of the current frame is processed according to a preset algorithm, and a quantity obtained through processing is used as the second quantity. The preset algorithm may be designed based on a requirement. For example, the preset algorithm may be: The second quantity=the quantity of sound sources in the sound field of the current frame+1, or the second quantity=the quantity of sound sources in the sound field of the current frame−1.

The encoder votes for each virtual speaker in the candidate virtual speaker set by using a small quantity of representative coefficients instead of all coefficients of the current frame, and selects the representative virtual speaker for the current frame based on vote values. Further, the encoder performs compression coding on the to-be-encoded three-dimensional audio signal by using the representative virtual speaker for the current frame. This effectively improves a compression rate of performing compression coding on the three-dimensional audio signal, and also reduces the calculation complexity of searching for the virtual speaker by the encoder. This reduces the calculation complexity of performing compression coding on the three-dimensional audio signal and the calculation load of the encoder.

Figure 9A:
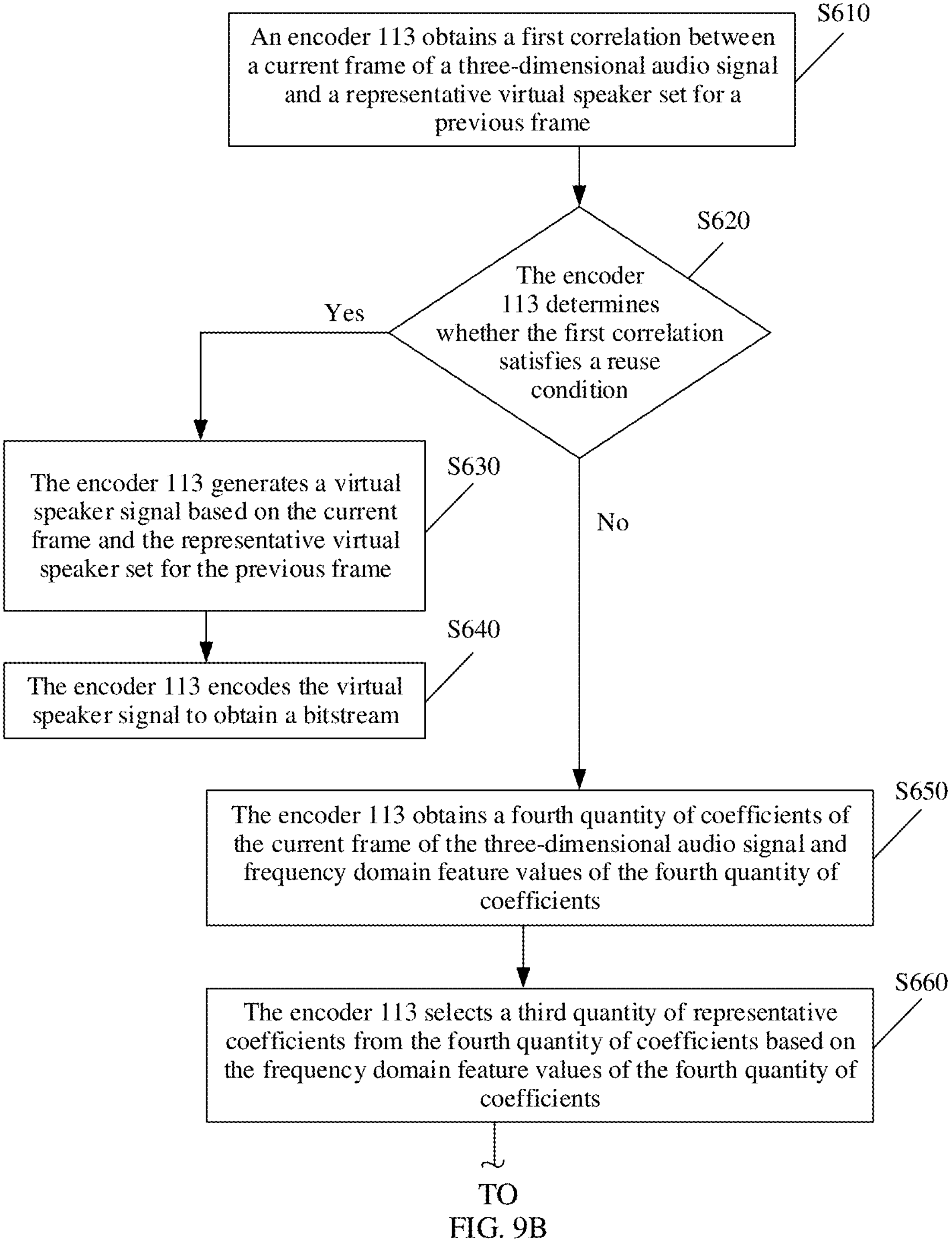
FIG. 9A and FIG. 9B are a schematic flowchart of another virtual speaker selection method according to an embodiment of this application.
Figure 9B:
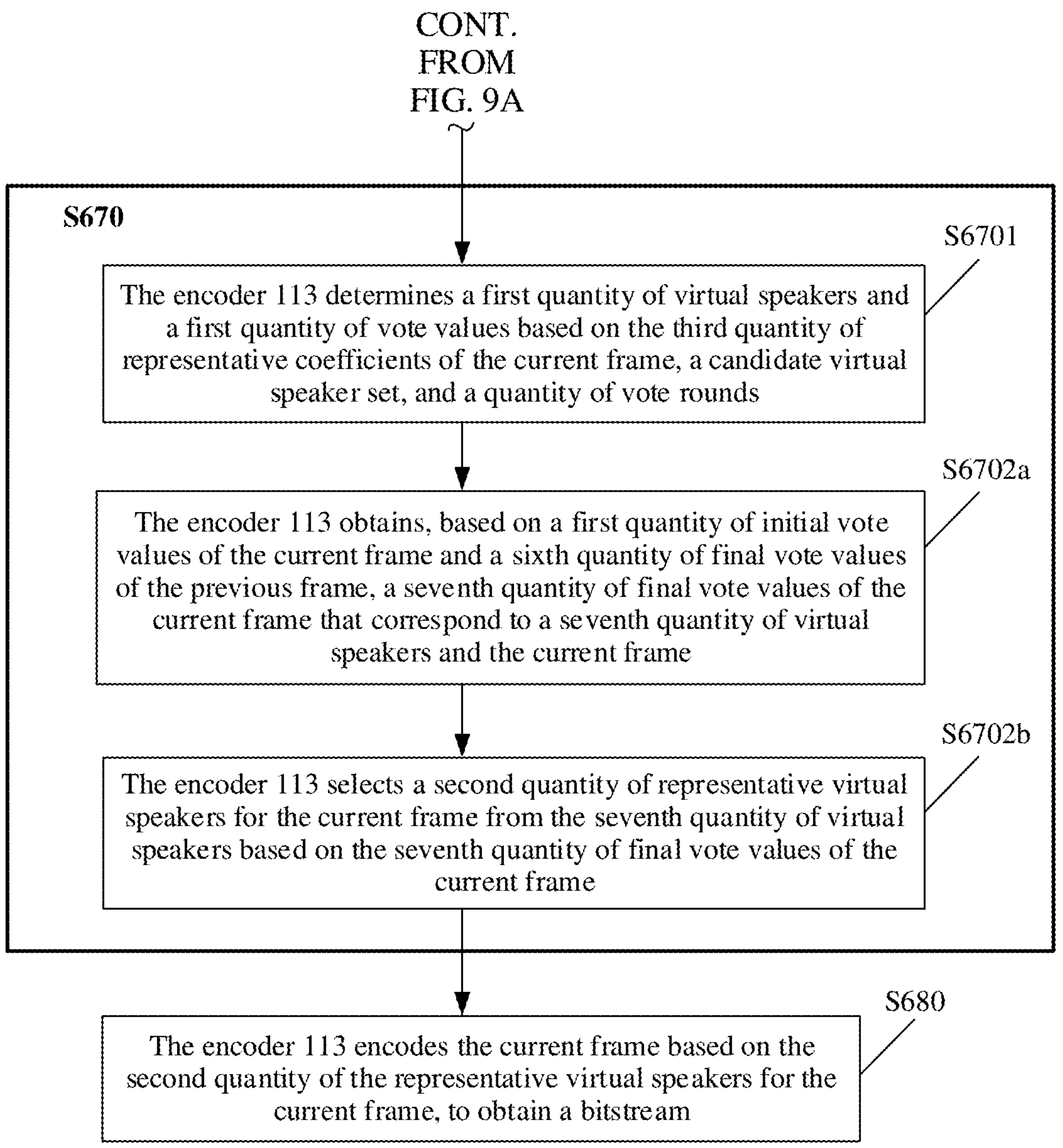

To increase orientation continuity between consecutive frames, and overcome a problem that results of selecting virtual speakers for consecutive frames vary greatly, the encoder 113 adjusts an initial vote value of the virtual speaker in the candidate virtual speaker set for the current frame based on the final vote value, for the previous frame, of the representative virtual speaker for the previous frame, to obtain the final vote value of the virtual speaker for the current frame. FIG. 9A and FIG. 9B are a schematic flowchart of another virtual speaker selection method according to an embodiment of this application. The method procedure in FIG. 9A and FIG. 9B is a description of a specific operation process included in S6702 in FIG. 8A and FIG. 8B.

S6702*a*: The encoder 113 obtains, based on a first quantity of initial vote values of the current frame and a sixth quantity of final vote values of the previous frame, a seventh quantity of final vote values of the current frame that correspond to a seventh quantity of virtual speakers and the current frame.

The encoder 113 may determine the first quantity of virtual speakers and the first quantity of vote values based on the current frame of the three-dimensional audio signal, the candidate virtual speaker set, and the quantity of vote rounds according to the method in S6701, and then use the first quantity of vote values as initial vote values of the current frame of the first quantity of virtual speakers.

The virtual speakers are in a one-to-one correspondence with the initial vote values of the current frame, that is, one virtual speaker is corresponding to one initial vote value of the current frame. For example, the first quantity of virtual speakers includes a first virtual speaker, the first quantity of initial vote values of the current frame includes an initial vote value of the current frame of the first virtual speaker, and the first virtual speaker corresponds to the initial vote value of the current frame of the first virtual speaker. The initial vote value of the current frame of the first virtual speaker represents a priority of using the first virtual speaker when the current frame is encoded.

The sixth quantity of virtual speakers included in the representative virtual speaker set for the previous frame are in a one-to-one correspondence with the sixth quantity of final vote values of the previous frame. The sixth quantity of virtual speakers may be representative virtual speakers for the previous frame used by the encoder 113 to encode the previous frame of the three-dimensional audio signal.

Specifically, the encoder 113 updates the first quantity of initial vote values of current frames based on the sixth quantity of final vote values of the previous frame. That is, the encoder 113 calculates a sum of the initial vote values of the current frame and the final vote values of the previous frame in the first quantity of virtual speakers and virtual speakers with the same number in the sixth quantity of virtual speakers, to obtain the seventh quantity of final vote values of the current frame that correspond to the seventh quantity of virtual speakers and the current frame. The seventh quantity of virtual speakers includes the first quantity of virtual speakers, and the seventh quantity of virtual speakers includes the sixth quantity of virtual speakers.

S6702*b*: The encoder 113 selects the second quantity of representative virtual speakers for the current frame from the seventh quantity of virtual speakers based on the seventh quantity of final vote values of the current frame.

The encoder 113 selects the second quantity of representative virtual speakers for the current frame from the seventh quantity of virtual speakers based on the seventh quantity of final vote values of the current frame, and the final vote values of the current frame in the second quantity of representative virtual speakers for the current frame are greater than the preset threshold.

The encoder 113 may alternatively select the second quantity of representative virtual speakers for the current frame from the seventh quantity of virtual speakers based on the seventh quantity of final vote values of the current frame. For example, a second quantity of final vote values of the current frame are determined from the seventh quantity of final vote values of the current frame in descending order of the seventh quantity of final vote values of the current frame, and a virtual speaker that is in the seventh quantity of virtual speakers and that is associated with the second quantity of final vote values of the current frame is used as the second quantity of representative virtual speakers for the current frame.

In some embodiments, if vote values of virtual speakers with different numbers in the seventh quantity of virtual speakers are the same, and the vote values of the virtual speakers with different numbers are greater than the preset threshold, the encoder 113 may use all the virtual speakers with different numbers as the representative virtual speakers for the current frame.

It should be noted that the second quantity is less than the seventh quantity. The seventh quantity of virtual speakers includes the second quantity of representative virtual speakers for the current frame. The second quantity may be preset, or the second quantity may be determined based on the quantity of sound sources in the sound field of the current frame.

In addition, before the encoder 113 encodes a next frame of the current frame, if the encoder 113 determines to reuse the representative virtual speaker for the previous frame to encode the next frame, the encoder 113 may use the second quantity of representative virtual speakers for the current frame as the second quantity of representative virtual speakers for the previous frame, and encode the next frame of the current frame by using the second quantity of representative virtual speakers for the previous frame.

Because a location of a real sound source does not necessarily overlap a location of a virtual speaker in a process of searching for the virtual speaker, the virtual speaker may not necessarily form a one-to-one correspondence with the real sound source. In addition, in an actual complex scenario, a limited quantity of virtual speaker sets may not represent all sound sources in a sound field. In this case, virtual speakers found in different frames may frequently change, and this change significantly affects auditory experience of a listener. As a result, obvious discontinuity and noise appear in a decoded and reconstructed three-dimensional audio signal. According to the virtual speaker selection method provided in this embodiment of this application, the representative virtual speaker for the previous frame is inherited. That is, for virtual speakers with a same number, an initial vote value of the current frame is adjusted by using a final vote value of the previous frame, so that the encoder more tends to select the representative virtual speaker for the previous frame. This alleviates frequent changes of virtual speakers in different frames, enhances continuity of signal orientations between frames, improves sound image stability of the reconstructed three-dimensional audio signal, and ensures sound quality of the reconstructed three-dimensional audio signal. In addition, parameters are adjusted to ensure that the final vote value of the previous frame is not inherited for a long time. This avoids that the algorithm cannot adapt to a sound field change, such as sound source movement.

It may be understood that, to implement the functions in the foregoing embodiments, the encoder includes a corresponding hardware structure and/or a corresponding software module for performing the functions. A person skilled in the art should be easily aware that, in combination with the units and the method operations in the examples described in the embodiments disclosed in this application, this application can be implemented by using hardware or a combination of hardware and computer software. Whether a function is performed by using hardware or hardware driven by computer software depends on particular application scenarios and design constraints of the technical solutions.

The foregoing describes in detail the three-dimensional audio signal encoding method provided in this embodiment with reference to FIG. 1 to FIG. 9A and FIG. 9B. The following describes a three-dimensional audio signal encoding apparatus and an encoder according to this embodiment with reference to FIG. 10 and FIG. 11.

Figure 10:
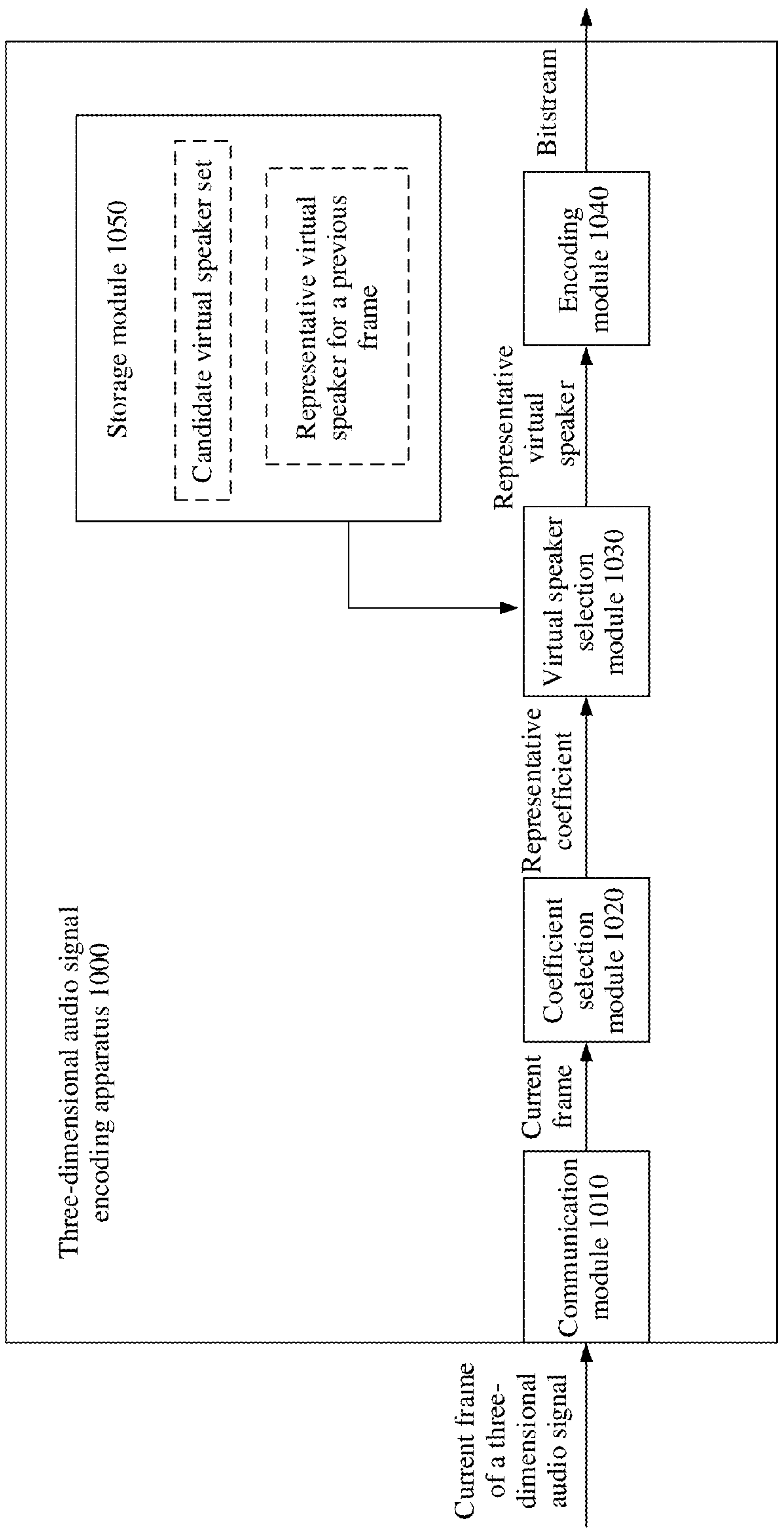
FIG. 10 is a schematic diagram of a structure of an encoding apparatus according to this application.

FIG. 10 is a schematic diagram of a possible structure of a three-dimensional audio signal encoding apparatus according to an embodiment. These three-dimensional audio signal encoding apparatuses may be configured to implement functions of encoding three-dimensional audio signals in the foregoing method embodiments, and therefore can also implement beneficial effect of the foregoing method embodiments. In this embodiment, the three-dimensional audio signal encoding apparatus may be the encoder 113 shown in FIG. 1, or the encoder 300 shown in FIG. 3, or may be a module (such as a chip) applied to a terminal device or a server.

As shown in FIG. 10, the three-dimensional audio signal encoding apparatus 1000 includes a communication module 1010, a coefficient selection module 1020, a virtual speaker selection module 1030, an encoding module 1040, and a storage module 1050. The three-dimensional audio signal encoding apparatus 1000 is configured to implement functions of the encoder 113 in the method embodiments shown in FIG. 6 to FIG. 9A and FIG. 9B.

The communication module 1010 is configured to obtain a current frame of a three-dimensional audio signal. In some embodiments, the communication module 1010 may alternatively receive a current frame of a three-dimensional audio signal obtained by another device; or obtain a current frame of the three-dimensional audio signal from the storage module 1050. The current frame of the three-dimensional audio signal is an HOA signal, and a frequency domain feature value of a coefficient is determined based on a coefficient of the HOA signal.

The virtual speaker selection module 1030 is configured to obtain a first correlation between the current frame of the three-dimensional audio signal and a representative virtual speaker set for a previous frame. A virtual speaker in the representative virtual speaker set for the previous frame is a virtual speaker used for encoding the previous frame of the three-dimensional audio signal, and the first correlation is used to determine whether to reuse the representative virtual speaker set for the previous frame when the current frame is encoded.

When the three-dimensional audio signal encoding apparatus 1000 is configured to implement the functions of the encoder 113 in the method embodiments shown in FIG. 6 to FIG. 9A and FIG. 9B, the virtual speaker selection module 1030 is configured to implement related functions of S610 to S630 and S670.

For example, the virtual speaker selection module 1030 obtains a second correlation between the current frame and a candidate virtual speaker set. The second correlation is used to determine whether the candidate virtual speaker set is used when the current frame is encoded, and the representative virtual speaker set for the previous frame is a proper subset of the candidate virtual speaker set. The reuse condition includes: The first correlation is greater than the second correlation.

For another example, the virtual speaker selection module 1030 obtains a third correlation between the current frame and a first subset of a candidate virtual speaker set. The third correlation is used to determine whether the first subset of the candidate virtual speaker set is used when the current frame is encoded, and the first subset is a proper subset of the candidate virtual speaker set. The reuse condition includes: The first correlation is greater than the third correlation.

For another example, the virtual speaker selection module 1030 obtains a fourth correlation between the current frame and a second subset of a candidate virtual speaker set, where the fourth correlation is used to determine whether the second subset of the candidate virtual speaker set is used when the current frame is encoded, and the second subset is a proper subset of the candidate virtual speaker set; and obtains a fifth correlation between the current frame and a third subset of the candidate virtual speaker set if the first correlation is less than or equal to the fourth correlation. The fifth correlation is used to determine whether the third subset of the candidate virtual speaker set is used when the current frame is encoded, the third subset is a proper subset of the candidate virtual speaker set, and a virtual speaker included in the second subset and a virtual speaker included in the third subset are all or partially different. The reuse condition includes: The first correlation is greater than the fifth correlation.

When the three-dimensional audio signal encoding apparatus 1000 is configured to implement the functions of the encoder 113 in the method embodiments shown in FIG. 6, the virtual speaker selection module 1030 is configured to implement related functions of S670. Specifically, the virtual speaker selection module 1030 is specifically configured to: When selecting a second quantity of representative virtual speakers for the current frame from the candidate virtual speaker set based on a third quantity of representative coefficients, the virtual speaker selection module is specifically configured to: determine a first quantity of virtual speakers and a first quantity of vote values based on the third quantity of representative coefficients of the current frame, the candidate virtual speaker set, and a quantity of vote rounds, where the virtual speakers are in a one-to-one correspondence with the vote values, the first quantity of virtual speakers include a first virtual speaker, a vote value of the first virtual speaker represents a priority of using the first virtual speaker when the current frame is encoded, the candidate virtual speaker set includes a fifth quantity of virtual speakers, the fifth quantity of virtual speakers include the first quantity of virtual speakers, the first quantity is less than or equal to the fifth quantity, the quantity of vote rounds is an integer greater than or equal to 1, and the quantity of vote rounds is less than or equal to the fifth quantity; and select the second quantity of representative virtual speakers for the current frame from the first quantity of virtual speakers based on the first quantity of vote values, where the second quantity is less than the first quantity.

When the three-dimensional audio signal encoding apparatus 1000 is configured to implement functions of the encoder 113 in the method embodiment shown in FIG. 9A and FIG. 9B, the virtual speaker selection module 1030 is configured to implement related functions of S6701 and S6702. Specifically, the virtual speaker selection module 1030 obtains, based on the first quantity of vote values and a sixth quantity of final vote values of the previous frame, a seventh quantity of final vote values of the current frame that correspond to a seventh quantity of virtual speakers and the current frame, where the seventh quantity of virtual speakers include the first quantity of virtual speakers, the seventh quantity of virtual speakers include a sixth quantity of virtual speakers, and virtual speakers included in the sixth quantity of virtual speakers are representative virtual speakers for the previous frame used for encoding the previous frame of the three-dimensional audio signal; and select the second quantity of representative virtual speakers for the current frame from the seventh quantity of virtual speakers based on the seventh quantity of final vote values of the current frame, where the second quantity is less than the seventh quantity.

When the three-dimensional audio signal encoding apparatus 1000 is configured to implement the functions of the encoder 113 in the method embodiments shown in FIG. 6, the coefficient selection module 1020 is configured to implement related functions of S650 and S660. Specifically, when obtaining the third quantity of representative coefficients of the current frame, the coefficient selection module 1020 is specifically configured to: obtain a fourth quantity of coefficients of the current frame and frequency domain feature values of the fourth quantity of coefficients; and select the third quantity of representative coefficients from the fourth quantity of coefficients based on the frequency domain feature values of the fourth quantity of coefficients, where the third quantity is less than the fourth quantity.

The encoding module 1040 is configured to encode the current frame based on the representative virtual speaker set for the previous frame if the first correlation satisfies a reuse condition, to obtain a bitstream.

When the three-dimensional audio signal encoding apparatus 1000 is configured to implement the functions of the encoder 113 in the method embodiments shown in FIG. 6 to FIG. 9A and FIG. 9B, the encoding module 1040 is configured to implement related functions of S630. For example, the encoding module 1040 is specifically configured to generate a virtual speaker signal based on the current frame and the representative virtual speaker set for the previous frame; and encode the virtual speaker signal, to obtain the bitstream.

The storage module 1050 is configured to store a coefficient related to the three-dimensional audio signal, the candidate virtual speaker set, the representative virtual speaker set for the previous frame, the selected coefficient, the virtual speaker, and the like, so that the encoding module 1040 encodes the current frame to obtain the bitstream, and transmits the bitstream to a decoder.

It should be understood that the three-dimensional audio signal encoding apparatus 1000 in this embodiment of this application may be implemented by using an application-specific integrated circuit (ASIC) or a programmable logic device (PLD). The PLD may be a complex programmable logic device (CPLD), a field-programmable gate array (FPGA), a generic array logic (GAL), or any combination thereof. When the three-dimensional audio signal encoding method shown in FIG. 6 to FIG. 9A and FIG. 9B may alternatively be implemented by using software, the three-dimensional audio signal encoding apparatus 1000 and modules thereof may also be software modules.

For more detailed descriptions of the communication module 1010, the coefficient selection module 1020, the virtual speaker selection module 1030, the encoding module 1040, and the storage module 1050, refer directly to related descriptions in the method embodiments shown in FIG. 6 to FIG. 9A and FIG. 9B. Details are not described herein again.

Figure 11:
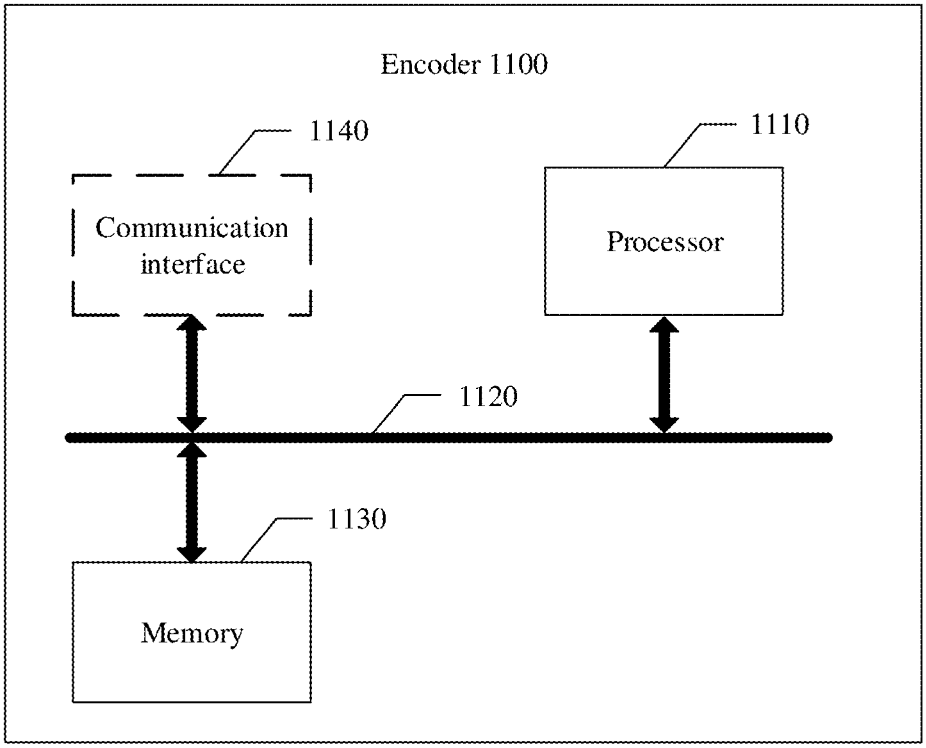
FIG. 11 is a schematic diagram of a structure of an encoder according to this application.

FIG. 11 is a schematic diagram of a structure of an encoder 1100 according to an embodiment. As shown in FIG. 11, an encoder 1100 includes a processor 1110, a bus 1120, a memory 1130, and a communication interface 1140.

It should be understood that, in this embodiment, the processor 1110 may be a central processing unit (CPU), or the processor 1110 may be another general-purpose processor or a digital signal processor (DSP), an ASIC, an FPGA or another programmable logic device, a discrete gate or transistor logic device, a discrete hardware component, or the like. The general-purpose processor may be a microprocessor, any conventional processor, or the like.

Alternatively, the processor may be a graphics processing unit (GPU), a neural network processing unit (NPU), a microprocessor, or one or more integrated circuits configured to control program execution in the solutions of this application.

The communication interface 1140 is configured to implement communication between the encoder 1100 and an external device or component. In this embodiment, the communication interface 1140 is configured to receive a three-dimensional audio signal.

The bus 1120 may include a path, configured to transmit information between the foregoing components (for example, the processor 1110 and the memory 1130). In addition to a data bus, the bus 1120 may further include a power bus, a control bus, a status signal bus, and the like. However, for clear description, various buses are marked as the bus 1120 in the figure.

In an example, the encoder 1100 may include a plurality of processors. The processor may be a multi-core (multi-CPU) processor. The processor herein may be one or more devices, circuits, and/or computing units configured to process data (for example, computer program instructions). The processor 1110 may invoke the coefficient related to the three-dimensional audio signal stored in the memory 1130, the candidate virtual speaker set, the representative virtual speaker set for the previous frame, the selected coefficient and virtual speaker.

It should be noted that, in FIG. 11, only an example in which the encoder 1100 includes one processor 1110 and one memory 1130 is used. Herein, the processor 1110 and the memory 1130 are separately configured to indicate a type of component or device. In a specific embodiment, a quantity of components or devices of each type may be determined based on a service requirement.

The memory 1130 may correspond to a storage medium, for example, a magnetic disk, such as a hard disk drive or a solid-state drive, configured to store information such as the coefficient related to the three-dimensional audio signal, the candidate virtual speaker set, the representative virtual speaker set for the previous frame, and the selected coefficient and virtual speaker in the foregoing method embodiments.

The encoder 1100 may be a general-purpose device or a dedicated device. For example, the encoder 1100 may be an X86-based or ARM-based server, or may be another dedicated server, for example, a policy control and charging (PCC) server. A type of the encoder 1100 is not limited in this embodiment of this application.

It should be understood that the encoder 1100 according to this embodiment may correspond to the three-dimensional audio signal encoding apparatus 1000 in this embodiment, and may correspond to a corresponding body for executing any method according to FIG. 6 to FIG. 9A and FIG. 9B. In addition, the foregoing and other operations and/or functions of the modules in the three-dimensional audio signal encoding apparatus 1000 are separately used to implement corresponding procedures of the methods in FIG. 6 to FIG. 9A and FIG. 9B. For brevity, details are not described herein again.

The method operations in this embodiment may be implemented by hardware, or may be implemented by a processor executing software instructions. The software instructions may include a corresponding software module. The software module may be stored in a random access memory (RAM), a flash memory, a read-only memory (ROM), a programmable read-only memory (PROM), an erasable programmable read-only memory (EPROM), an electrically erasable programmable read-only memory (EEPROM), a register, a hard disk, a removable hard disk, a CD-ROM, or any other form of storage medium well-known in the art. For example, a storage medium is coupled to a processor, so that the processor can read information from the storage medium and write information into the storage medium. Certainly, the storage medium may be a component of the processor. The processor and the storage medium may be disposed in an ASIC. In addition, the ASIC may be located in a network device or a terminal device. Certainly, the processor and the storage medium may alternatively exist as discrete components in a network device or a terminal device.

All or some of the foregoing embodiments may be implemented by using software, hardware, firmware, or any combination thereof. When software is used to implement the embodiments, all or some of the embodiments may be implemented in a form of a computer program product. The computer program product includes one or more computer programs or instructions. When the computer programs or instructions are loaded and executed on a computer, all or some of the procedures or functions in embodiments of this application are executed. The computer may be a general-purpose computer, a dedicated computer, a computer network, a network device, user equipment, or another programmable apparatus. The computer programs or instructions may be stored in a computer-readable storage medium, or may be transmitted from a computer-readable storage medium to another computer-readable storage medium. For example, the computer programs or instructions may be transmitted from a website, computer, server, or data center to another website, computer, server, or data center in a wired manner or in a wireless manner. The computer-readable storage medium may be any usable medium that can be accessed by a computer, or a data storage device, such as a server or a data center, integrating one or more usable media. The usable medium may be a magnetic medium, for example, a floppy disk, a hard disk, or a magnetic tape, may be an optical medium, for example, a digital video disc (DVD), or may be a semiconductor medium, for example, a solid-state drive (SSD).

The foregoing descriptions are merely specific embodiments of this application, but are not intended to limit the protection scope of this application. Any modification or replacement readily figured out by a person skilled in the art within the technical scope disclosed in this application shall fall within the protection scope of this application. Therefore, the protection scope of this application shall be subject to the protection scope of the claims.

What is claimed is:

1. A three-dimensional audio signal encoding method performed by at least one processor, coupled with a memory configured to store a computer program, which when executed by the at least one processor, causes the at least one processor to perform the method, comprising:

obtaining a first correlation between a current frame of a three-dimensional audio signal and a representative virtual speaker set for a previous frame, wherein a virtual speaker in the representative virtual speaker set for the previous frame is used for encoding the previous frame of the three-dimensional audio signal, and the first correlation is used to determine whether to reuse the representative virtual speaker set for the previous frame when the current frame is encoded;

obtaining, after the obtaining the first correlation, a second correlation between the current frame and a candidate virtual speaker set, wherein the second correlation is used to determine whether the candidate virtual speaker set is used when the current frame is encoded, and the representative virtual speaker set for the previous frame is a proper subset of the candidate virtual speaker set;

encoding, by an encoder, the current frame based on the representative virtual speaker set for the previous frame when the first correlation satisfies a reuse condition, to obtain a bitstream, wherein the reuse condition comprise: the first correlation being greater than the second correlation; and decoding, with a decoder communicatively coupled with the encoder, the bitstream generated by the encoder.

2. The method according to claim 1, wherein the obtaining the second correlation between the current frame and the candidate virtual speaker set comprises:

obtaining correlations between the current frame and each candidate virtual speaker in the candidate virtual speaker set; and using a largest correlation in the correlations between the current frame and the candidate virtual speakers as the second correlation.

3. The method according to claim 1, wherein the obtaining the first correlation between the current frame of the three-dimensional audio signal and the representative virtual speaker set for the previous frame comprises:

obtaining correlations between the current frame and each representative virtual speaker for the previous frame in the representative virtual speaker set for the previous frame; and using a largest correlation in the correlations between the current frame and the representative virtual speakers for the previous frame as the first correlation.

4. The method according to claim 1, wherein after the obtaining the first correlation between the current frame of the three-dimensional audio signal and the representative virtual speaker set for the previous frame, the method further comprises:

obtaining a third correlation between the current frame and a first subset of a candidate virtual speaker set, wherein the third correlation is used to determine whether the first subset of the candidate virtual speaker set is used when the current frame is encoded, and the first subset is a proper subset of the candidate virtual speaker set; and the reuse condition comprises: the first correlation is greater than the third correlation.

5. The method according to claim 1, wherein after the obtaining the first correlation between the current frame of the three-dimensional audio signal and the representative virtual speaker set for the previous frame, the method further comprises:

obtaining a fourth correlation between the current frame and a second subset of a candidate virtual speaker set, wherein the fourth correlation is used to determine whether the second subset of the candidate virtual speaker set is used when the current frame is encoded, and the second subset is a proper subset of the candidate virtual speaker set; and obtaining a fifth correlation between the current frame and a third subset of the candidate virtual speaker set when the first correlation is less than or equal to the fourth correlation, wherein the fifth correlation is used to determine whether the third subset of the candidate virtual speaker set is used when the current frame is encoded, the third subset is a proper subset of the candidate virtual speaker set, and a virtual speaker comprised in the second subset and a virtual speaker comprised in the third subset are all or partially different; and the reuse condition comprises: the first correlation is greater than the fifth correlation.

6. The method according to claim 1, wherein the representative virtual speaker set for the previous frame comprises a first virtual speaker, and the obtaining the first correlation between the current frame of the three-dimensional audio signal and the representative virtual speaker set for the previous frame comprises:

determining a correlation between the current frame and the first virtual speaker based on a coefficient of the current frame and a coefficient of the first virtual speaker.

7. The method according to claim 1, wherein when the first correlation does not satisfy the reuse condition, the method further comprises:

obtaining a fourth quantity of coefficients of the current frame of the three-dimensional audio signal and frequency domain feature values of the fourth quantity of coefficients;

selecting a third quantity of representative coefficients from the fourth quantity of coefficients based on the frequency domain feature values of the fourth quantity of coefficients, wherein the third quantity is less than the fourth quantity;

selecting a second quantity of representative virtual speakers for the current frame from the candidate virtual speaker set based on the third quantity of representative coefficients; and encoding the current frame based on the second quantity of the representative virtual speakers for the current frame, to obtain the bitstream.

8. The method according to claim 1, wherein the current frame of the three-dimensional audio signal is a higher order ambisonics (HOA) signal, and a frequency domain feature value of a coefficient of the current frame is determined based on a coefficient of the HOA signal.

9. An encoder, comprising:

at least one processor; and a memory, coupled with the at least on processor, configured to store a computer program, which when executed by the at least one processor, causes the encoder to perform a three-dimensional audio signal encoding method, comprising:

obtaining a first correlation between a current frame of a three-dimensional audio signal and a representative virtual speaker set for a previous frame, wherein a virtual speaker in the representative virtual speaker set for the previous frame is used for encoding the previous frame of the three-dimensional audio signal, and the first correlation is used to determine whether to reuse the representative virtual speaker set for the previous frame when the current frame is encoded, obtaining, after the obtaining the first correlation, a second correlation between the current frame and a candidate virtual speaker set, wherein the second correlation is used to determine whether the candidate virtual speaker set is used when the current frame is encoded, and the representative virtual speaker set for the previous frame is a proper subset of the candidate virtual speaker set, encoding the current frame based on the representative virtual speaker set for the previous frame when the first correlation satisfies a reuse condition, to obtain a bitstream, wherein the reuse condition comprise: the first correlation being greater than the second correlation, and decoding, with a decoder communicatively coupled with the encoder, the bitstream generated by the encoder.

10. The encoder according to claim 9, wherein the encoder obtaining the second correlation between the current frame and the candidate virtual speaker set comprises:

obtaining correlations between the current frame and each candidate virtual speaker in the candidate virtual speaker set; and using a largest correlation in the correlations between the current frame and the candidate virtual speakers as the second correlation.

11. The encoder according to claim 9, wherein the encoder obtaining the first correlation between the current frame of the three-dimensional audio signal and the representative virtual speaker set for the previous frame, further comprises the encoder configured to perform operations for:

obtaining correlations between the current frame and each representative virtual speaker for the previous frame in the representative virtual speaker set for the previous frame; and using a largest correlation in the correlations between the current frame and the representative virtual speakers for the previous frame as the first correlation.

12. The encoder according to claim 9, wherein after the obtaining the first correlation between the current frame of the three-dimensional audio signal and the representative virtual speaker set for the previous frame, the encoder is further configured to perform operations, comprising:

obtaining a third correlation between the current frame and a first subset of a candidate virtual speaker set, wherein the third correlation is used to determine whether the first subset of the candidate virtual speaker set is used when the current frame is encoded, and the first subset is a proper subset of the candidate virtual speaker set; and the reuse condition comprises: the first correlation is greater than the third correlation.

13. The encoder according to claim 9, wherein after the obtaining the first correlation between the current frame of the three-dimensional audio signal and the representative virtual speaker set for the previous frame, the encoder is further configured to perform operations, comprising:

obtaining a fourth correlation between the current frame and a second subset of a candidate virtual speaker set, wherein the fourth correlation is used to determine whether the second subset of the candidate virtual speaker set is used when the current frame is encoded, and the second subset is a proper subset of the candidate virtual speaker set; and obtaining a fifth correlation between the current frame and a third subset of the candidate virtual speaker set when the first correlation is less than or equal to the fourth correlation, wherein the fifth correlation is used to determine whether the third subset of the candidate virtual speaker set is used when the current frame is encoded, the third subset is a proper subset of the candidate virtual speaker set, and a virtual speaker comprised in the second subset and a virtual speaker comprised in the third subset are all or partially different; and the reuse condition comprises: the first correlation is greater than the fifth correlation.

14. The encoder according to claim 9, wherein the representative virtual speaker set for the previous frame comprises a first virtual speaker, and the encoder obtaining the first correlation between the current frame of the three-dimensional audio signal and the representative virtual speaker set for the previous frame, further comprises the encoder configured to perform operations for:

determining a correlation between the current frame and the first virtual speaker based on a coefficient of the current frame and a coefficient of the first virtual speaker.

15. The encoder according to claim 9, wherein when the first correlation does not satisfy the reuse condition, the encoder is further configured to perform operations comprising:

obtaining a fourth quantity of coefficients of the current frame of the three-dimensional audio signal and frequency domain feature values of the fourth quantity of coefficients;

selecting a third quantity of representative coefficients from the fourth quantity of coefficients based on the frequency domain feature values of the fourth quantity of coefficients, wherein the third quantity is less than the fourth quantity;

selecting a second quantity of representative virtual speakers for the current frame from the candidate virtual speaker set based on the third quantity of representative coefficients; and encoding the current frame based on the second quantity of the representative virtual speakers for the current frame, to obtain the bitstream.

16. The encoder according to claim 9, wherein the current frame of the three-dimensional audio signal is a higher order ambisonics (HOA) signal, and a frequency domain feature value of a coefficient of the current frame is determined based on a coefficient of the HOA signal.

17. A system, comprising:

an encoder comprising at least one processor and a memory, the memory is configured to store a computer program, which when executed by the at least one processor, causes the encoder to perform a three-dimensional audio signal encoding method, comprising:

obtaining a first correlation between a current frame of a three-dimensional audio signal and a representative virtual speaker set for a previous frame, wherein a virtual speaker in the representative virtual speaker set for the previous frame is used for encoding the previous frame of the three-dimensional audio signal, and the first correlation is used to determine whether to reuse the representative virtual speaker set for the previous frame when the current frame is encoded, obtaining, after the obtaining the first correlation, a second correlation between the current frame and a candidate virtual speaker set, wherein the second correlation is used to determine whether the candidate virtual speaker set is used when the current frame is encoded, and the representative virtual speaker set for the previous frame is a proper subset of the candidate virtual speaker set, and encoding the current frame based on the representative virtual speaker set for the previous frame when the first correlation satisfies a reuse condition, to obtain a bitstream, wherein the reuse condition comprise: the first correlation being greater than the second correlation; and a decoder, communicatively coupled with the encoder, configured to decode the bitstream generated by the encoder.

18. A non-transitory computer-readable storage medium, having instructions stored thereon for a three-dimensional audio signal encoding method that obtains a bitstream, which when executed by at least one processor of a system, causes the system to perform the method, comprising:

obtaining a first correlation between a current frame of a three-dimensional audio signal and a representative virtual speaker set for a previous frame, wherein a virtual speaker in the representative virtual speaker set for the previous frame is used for encoding the previous frame of the three-dimensional audio signal, and the first correlation is used to determine whether to reuse the representative virtual speaker set for the previous frame when the current frame is encoded;

obtaining, after the obtaining the first correlation, a second correlation between the current frame and a candidate virtual speaker set, wherein the second correlation is used to determine whether the candidate virtual speaker set is used when the current frame is encoded, and the representative virtual speaker set for the previous frame is a proper subset of the candidate virtual speaker set;

encoding, by an encoder, the current frame based on the representative virtual speaker set for the previous frame when the first correlation satisfies a reuse condition, to obtain a bitstream, wherein the reuse condition comprise: the first correlation being greater than the second correlation; and decoding, by a decoder communicatively coupled with the encoder, the bitstream generated by the encoder.

* * * * *